United States Patent
Scherzinger et al.

(10) Patent No.: US 7,855,678 B2
(45) Date of Patent: Dec. 21, 2010

(54) POST-MISSION HIGH ACCURACY POSITION AND ORIENTATION SYSTEM

(75) Inventors: Bruno M. Scherzinger, Richmond Hill (CA); Joseph J. Hutton, Toronto (CA); Ulrich Vollath, Ismaning (DE)

(73) Assignee: Trimble Navigation Limited, Sunnyvale, CA (US)

( * ) Notice: Subject to any disclaimer, the term of this patent is extended or adjusted under 35 U.S.C. 154(b) by 58 days.

(21) Appl. No.: 11/804,328

(22) Filed: May 16, 2007

(65) Prior Publication Data

US 2008/0284643 A1    Nov. 20, 2008

(51) Int. Cl.
*G01S 19/40* (2006.01)
*G01S 19/31* (2010.01)

(52) U.S. Cl. ............................. 342/357.23; 342/357.71

(58) Field of Classification Search ............ 342/357.02, 342/357.04, 357.06, 357.15, 357.23, 357.71; 701/213, 215
See application file for complete search history.

(56) References Cited

U.S. PATENT DOCUMENTS

| | | | |
|---|---|---|---|
| 5,381,140 A | 1/1995 | Kuroda et al. | |
| 5,914,685 A | 6/1999 | Kozlov et al. | |
| 5,983,161 A | 11/1999 | Lemelson et al. | |
| 6,140,957 A | 10/2000 | Wilson et al. | |
| 6,198,989 B1 | 3/2001 | Tankhilevich et al. | |
| 6,229,479 B1 | 5/2001 | Kozlov et al. | |
| 6,278,945 B1 | 8/2001 | Lin | |
| 6,311,129 B1 | 10/2001 | Lin | |
| 6,317,603 B1 | 11/2001 | Allison | |
| 6,324,473 B1 | 11/2001 | Eschenbach | |
| 6,408,245 B1 | 6/2002 | An et al. | |
| 6,417,802 B1 | 7/2002 | Diesel | |
| 6,424,914 B1 | 7/2002 | Lin | |
| 6,427,122 B1 | 7/2002 | Lin | |
| 6,449,559 B2 | 9/2002 | Lin | |
| 6,496,778 B1 | 12/2002 | Lin | |
| 6,529,830 B1 | 3/2003 | Eschenbach | |
| 6,631,323 B2 | 10/2003 | Tucker et al. | |
| 6,727,849 B1 | 4/2004 | Kirk et al. | |
| 6,741,935 B1 | 5/2004 | Eschenbach | |

(Continued)

FOREIGN PATENT DOCUMENTS

WO    WO 2007/032947    3/2007

OTHER PUBLICATIONS

Landau, Herbert et al., "Virtual Reference Stations versus Broadcast Solutions in Network RTK—Advantages and Limitations," GNSS 2003, Apr. 2003, Graz, Austria, 15 pages.

(Continued)

*Primary Examiner*—Dao L Phan
(74) *Attorney, Agent, or Firm*—Perkins Coie LLP

(57) ABSTRACT

A method of generating post-mission position and orientation data comprises generating position and orientation data representing positions and orientations of a mobile platform, based on global navigation satellite system (GNSS) data and inertial navigation system (INS) data acquired during a data acquisition period by the mobile platform, using a network real-time kinematic (RTK) subsystem to generate correction data associated with the data acquisition period, and correcting the position and orientation data based on the correction data. The RTK subsystem may implement a virtual reference station (VRS) technique to generate the correction data.

9 Claims, 13 Drawing Sheets

U.S. PATENT DOCUMENTS

| | | | |
|---|---|---|---|
| 6,862,526 | B2 | 3/2005 | Robbins |
| 6,950,059 | B2 | 9/2005 | Rapoport et al. |
| 6,961,018 | B2 | 11/2005 | Heppe et al. |
| 6,982,669 | B2 | 1/2006 | Coatantiec et al. |
| 6,985,104 | B2 | 1/2006 | Large et al. |
| 7,071,870 | B2 | 7/2006 | Sharpe et al. |
| 7,480,511 | B2 | 1/2009 | O'Meagher |
| 7,490,008 | B2 | 2/2009 | Draganov |
| 7,511,661 | B2 | 3/2009 | Hatch et al. |
| 7,599,796 | B2 | 10/2009 | Tsai et al. |
| 2001/0020216 | A1 | 9/2001 | Lin |
| 2005/0043882 | A1 | 2/2005 | Takazawa |
| 2005/0064878 | A1 | 3/2005 | O'Meagher |
| 2005/0151683 | A1 | 7/2005 | Sharpe et al. |
| 2005/0203701 | A1 | 9/2005 | Scherzinger |
| 2005/0264444 | A1 | 12/2005 | Sharpe et al. |
| 2006/0047413 | A1 | 3/2006 | Lopez et al. |
| 2006/0152407 | A1 | 7/2006 | Hatch et al. |
| 2007/0032951 | A1* | 2/2007 | Tanenhaus et al. .......... 701/220 |
| 2008/0122785 | A1 | 5/2008 | Harmon |

OTHER PUBLICATIONS

Large, Peter et al., "eRTK: A New Generation of Solutions for Centimeter-Accurate Wide-Area Real-Time Positioning," Trimble Navigation Limited, Sunnyvale, California, USA, 2001, 9 pages.

Lenz, Elmar, "Networked Transport of RTCM via Internet Protocol (NTRIP)—Application and Benefit in Modern Surveying Systems," FIG Working Week 2004, Athens, Greece, May 22-27, 2004, 11 pages.

Pugh, Nathan, "Scalable GPS Infrastructure: The Building Blocks of Tomorrow," Trimble Navigation Limited, Sunnyvale, California, USA, 2005, 9 pages.

Scherzinger, Bruno M., "Precise Robust Positioning with Inertially Aided RTK," Applanix Corporation, Richmond Hill, Ontario, Canada, Jul. 13, 2006, 36 pages.

"Stepping Into Infrastructure," Technology & more, Issue 2, 2005, p. 16.

"Support of Network Formats by Trimble GPSNet Network RTK Solution," Trimble Terrasat GmbH, Hoehenkirchen, Germany, 2005, 8 pages.

Landau, Herbert et al., "Virtual Reference Station Systems," Journal of Global Positioning Systems, 2002, vol. 1, No. 2: 137-143.

Wiederholt, Lawrence F. et al., "Phase III GPS Integration Options for Aircraft Platforms," Navigation: Journal of The Institute of Navigation, 1984, vol. 31, No. 2: 129-151.

El-Mowafy, Ahmed, "Using Multiple Reference Station GPS Networks for Aircraft Precision Approach and Airport Surface Navigation," Journal of Global Positioning System, 2005, vol. 4, No. 1-2: 2-11.

Cunha, T. et al., "Position=Attitude from GPS=INS for RTK Airborne Sensoring," ION 55th Annual Meeting, Cambridge, MA, USA, Jun. 28-30, 1999, abstract.

Chang, Hsing-Chung et al., "Validation of DEMs derived from radar interferometry, airborne laser scanning and photogrammetry by using GPS-RTK," Geoscience and Remote Sensing Symposium, 2004, IGARSS '04, Proceedings, 2004 IEEE International, Sep. 20-24, 2004, vol. 5, abstract.

Co-pending U.S. Appl. No. 11/867,639 filed Oct. 4, 2007.

Co-pending U.S. Appl. No. 12/690,287 filed Jan. 20, 2010.

International Search Report PCT/US2008/063553; dated Jul. 18, 2008; One Page.

Written Opinion PCT/US2008/063553 dated Jul. 18, 2008; pp. 1-6.

Office Action mailed on Oct. 26, 2009 in co-pending U.S. Appl. No. 11/867,639.

Final Office Action Mailed Jul. 8, 2010 in Co-Pending U.S. Appl. No. 11/867,639 filed Oct. 4, 2007.

* cited by examiner

POST-MISSION HIGH ACCURACY POSITION AND ORIENTATION SYSTEM

FIELD OF THE INVENTION

At least one embodiment of the present invention pertains to a global navigation satellite system (GNSS) aided inertial navigation system (INS) and, more particularly, to a GNSS-aided INS (GNSS-AINS) post-mission high accuracy position and orientation system.

BACKGROUND

A Global Navigation Satellite System (GNSS) is a navigation system that makes use of a constellation of satellites orbiting the earth to provide signals to a receiver on the earth that computes its position on the earth from those signals. Examples of such satellite systems are the NAVSTAR Global Positioning System (GPS) deployed and maintained by the United States, the GLONASS system deployed by the Soviet Union and maintained by the Russian Federation, and the GALILEO system currently being deployed by the European Union (EU).

Each GPS satellite transmits continuously using two radio frequencies in the L-band, referred to as L1 and L2, at respective frequencies of 1575.41 MHz and 1227.60 MHz. Two signals are transmitted on L1, one for civil users and the other for users authorized by the Unites States Department of Defense (DoD). One signal is transmitted on L2, intended only for DoD-authorized users. Each GPS signal has a carrier at the L1 and L2 frequencies, a pseudo-random number (PRN) code, and satellite navigation data. Two different PRN codes are transmitted by each satellite: a coarse acquisition (C/A) code and a precision (P/Y) code which is encrypted for use by authorized users. A GPS receiver designed for precision positioning contains multiple channels, each of which can track the signals on both L1 and L2 frequencies from a GPS satellite in view above the horizon at the receiver antenna, and from these computes the observables for that satellite comprising the L1 pseudorange, possibly the L2 pseudorange and the coherent L1 and L2 carrier phases. Coherent phase tracking implies that the carrier phases from two channels assigned to the same satellite and frequency will differ only by an integer number of cycles.

Each GLONASS satellite transmits continuously using two radio frequency bands in the L-band, also referred to as L1 and L2. Each satellite transmits on one of multiple frequencies within the L1 and L2 bands respectively centered at frequencies of 1602.0 MHz and 1246.0 MHz. The code and carrier signal structure is similar to that of NAVSTAR. A GNSS receiver designed for precision positioning contains multiple channels each of which can track the signals from both GPS and GLONASS satellites on their respective L1 and L2 frequencies, and generate pseudorange and carrier phase observables from these. Future generations of GNSS receivers will include the ability to track signals from all deployed GNSSs.

The purpose of an AINS is to compute navigation data comprising vehicle position, velocity, acceleration, orientation (e.g., roll, pitch, heading) and angular rate via the combination of an inertial navigation system (INS) and aiding navigation sensors. A GNSS-aided INS uses one or more receivers capable of receiving and processing signals from one or more GNSS's as an aiding sensor. GNSS-AINS has been successfully demonstrated as an accurate source of position and orientation information for various survey applications from a moving platform. One of the most significant achievements in recent years is the successful demonstration and subsequent deployment of a GNSS-AINS for direct georeferencing of aerial photogrammetry images. Other applications include mobile mapping/survey from a land vehicle and sea floor bathymetry from a survey vessel.

To achieve accurate positioning of a mobile platform with a GNSS-AINS, relative or differential positioning methods are commonly employed. These methods use a reference GNSS receiver located at a known position, in addition to the data from the INS and the rover GNSS receiver (both on the mobile platform), to compute the position of the mobile platform relative to the reference receiver. The most accurate known method uses relative GNSS carrier phase interferometry between the rover and reference GNSS antennas plus resolution of integer wavelength ambiguities in the differential phases to achieve centimeter-level positioning accuracies. These differential GNSS methods are predicated on the near exact correlation of several common errors in the rover and reference observables. They include ionospheric and tropospheric signal delay errors, satellite orbit and clock errors, and receiver clock errors.

When the baseline length between the mobile platform and the reference receiver does not exceed 10 kilometers, which is normally considered a short baseline condition, the ionospheric and tropospheric signal delay errors in the observables from the rover and reference receivers are almost exactly the same. These atmospheric delay errors therefore cancel in the rover-reference differential GNSS observables, and the carrier phase ambiguity resolution process required for achieving centimeter-level relative positioning accuracy is not perturbed by them. If the baseline length increases beyond 10 kilometers (considered a long baseline condition), these errors at the rover and reference receiver antennas become increasingly different, so that their presence in the rover-reference differential GNSS observables and their influence on the ambiguity resolution process increases. Ambiguity resolution on single rover-reference receiver baselines beyond 10 kilometers becomes increasingly unreliable. This attribute limits the mobility of a GNSS-AINS with respect to a single reference receiver, and essentially makes it unusable on a mobile mapping platform that covers large distances as part of its mission, such as an aircraft.

A network GNSS method computes the position of a rover receiver using reference observables from three or more reference receivers that approximately surround the rover receiver trajectory. This implies that the rover receiver trajectory is mostly contained by a closed polygon whose vertices are the reference receiver antennas. The rover receiver can move a few kilometers outside this polygon without significant loss of positioning accuracy. A network GNSS algorithm calibrates the ionospheric and tropospheric signal delays at each reference receiver position and then interpolates and possibly extrapolates these to the rover position to achieve better signal delay cancellation on long baselines that could be had with a single reference receiver. Various methods of signal processing can be used, however they all yield essentially the same performance improvement on long baselines. As with single baseline GNSS, known GNSS solutions are still inadequate for a mobile mapping platform that covers large distances as part of its mission, such as an aircraft.

Another problem associated with mobile mapping/survey applications is an insufficiently fast recovery of positioning accuracy after a loss of the rover GNSS signal. The typical time to recovery of reliable precise positioning accuracy is 15-60 seconds, depending on the number of observables and their geometry used in the position solution. Such signal outages tend to occur on an aircraft engaged in a survey mission when the aircraft executes rapid high bank-angle turns ("sharp turns") from one survey line to the next. Sharp turns between survey lines provide the most economical execution of a survey mission. Typical survey trajectories include many parallel survey lines joined by 180-degree turns. Consequently these sharp turns and resulting signal outages can occur frequently. Previous GNSS-AINS implementations for this application required the pilot to fly low bank angle turns ("flat turns") to maintain the rover GNSS antenna orientation toward the sky and thereby avoid GNSS signal loss. Such flat turns required significantly longer times to execute than sharp turns, resulting in additional aircraft operation expenses.

FIG. 1 shows a known architecture for an AINS. The IMU 1 generates incremental velocities and incremental angles at the IMU sampling rate, which is typically 50 to 500 samples per second. The corresponding IMU sampling time interval is the inverse of the IMU sampling rate, typically 1/50 to 1/500 seconds. The incremental velocities are the specific forces from the IMU accelerometers integrated over the IMU sampling time interval. The incremental angles are the angular rates from gyroscopes in the IMU 1, integrated over the IMU sampling time interval. The inertial navigator 2 receives the inertial data from the IMU and computes the current IMU position (typically latitude, longitude and altitude), velocity (typically North, East and Down components) and orientation (roll, pitch and heading) at the IMU sampling rate.

The aiding sensors 5 are any sensors that provide navigation information that is statistically independent of the inertial navigation solution that the INS generates. Examples of aiding sensors are one or more GNSS receivers, an odometer or distance measuring indicator (DMI), and a Doppler radar velocity detector.

The purpose of the Kalman filter 4 in the AINS configuration is to estimate the errors in the inertial navigator mechanization and the inertial sensor errors. The Kalman filter 5 does this by comparing the INS navigation data with comparable data from the aiding sensors 5. The closed-loop error controller 3 then corrects the inertial navigator 2 to achieve a navigation accuracy improvement over what an unaided inertial navigator would be capable of achieving.

The Kalman filter 4 implements a recursive minimum-variance estimation algorithm that computes an estimate of a state vector based on constructed measurements. The measurements typically comprise computed differences between the inertial navigation solution elements and corresponding data elements from the aiding sensors. For example, an inertial-GNSS position measurement comprises the differences in the latitudes, longitudes and altitudes respectively computed by the inertial navigator and a GNSS receiver. The true positions cancel in the differences, so that the differences in the position errors remain. A Kalman filter designed for integration of an INS and aiding sensors will typically estimate the errors in the INS and aiding sensors. The INS errors typically comprise the following: inertial North, East and Down position errors; inertial North, East and Down velocity errors; inertial platform misalignment errors; accelerometer biases; and gyro biases. Aiding sensor errors can include the following: GNSS North, East and Down position errors; GNSS carrier phase ambiguities; and DMI scale factor error.

The error controller 3 computes a vector of resets from the INS error estimates generated by the Kalman filter and applies these to the inertial navigator integration processes, thereby regulating the inertial navigator errors in a closed-loop error control mechanization. This method of INS error control causes the inertial navigator errors to be continuously regulated and hence maintained at significantly smaller magnitudes than an uncontrolled or free-inertial navigator would be capable of achieving.

Kinematic ambiguity resolution (KAR) satellite navigation is a technique used in applications requiring high position accuracy such as land survey and construction and agriculture, based on the use of carrier phase measurements of satellite positioning system signals, where a single reference station provides the real-time corrections with high accuracy. KAR combines the L1 and L2 carrier phases from the rover and reference receivers so as to establish a relative phase interferometry position of the rover antenna with respect to the reference antenna. A coherent L1 or L2 carrier phase observable can be represented as a precise pseudorange scaled by the carrier wavelength and biased by an integer number of unknown cycles known as cycle ambiguities. Differential combinations of carrier phases from the rover and reference receivers result in the cancellation of all common mode range errors except the integer ambiguities. An ambiguity resolution algorithm uses redundant carrier phase observables from the rover and reference receivers, and the known reference antenna position, to estimate and thereby resolve these ambiguities.

Once the integer cycle ambiguities are known, the rover receiver can compute its antenna position with accuracies generally on the order of a few centimeters, provided that the rover and reference antennas are not separated by more than 10 kilometers. This method of precise positioning performed in real-time is commonly referred to as real-time kinematic (RTK) positioning.

The reason for the rover-reference separation constraint is that KAR positioning relies on near exact correlation of atmospheric signal delay errors between the rover and reference receiver observables, so that they cancel in the rover-reference observables combinations (for example, differences between rover and reference observables per satellite). The largest error in carrier-phase positioning solutions is introduced by the ionosphere, a layer of charged gases surrounding the earth. When the signals radiated from the satellites penetrate the ionosphere on their way to the ground-based receivers, they experience delays in their signal travel times and shifts in their carrier phases. A second significant source of error is the troposphere delay. When the signals radiated from the satellites penetrate the troposphere on their way to the ground-based receivers, they experience delays in their signal travel times that are dependent on the temperature, pressure and humidity of the atmosphere along the signal paths. Fast and reliable positioning requires good models of the spatio-temporal correlations of the ionosphere and troposphere to correct for these non-geometric influences.

When the rover-reference separation exceeds 10 kilometers, the atmospheric delay errors become decorrelated and do not cancel exactly. The residual errors can now interfere with the ambiguity resolution process and thereby make correct ambiguity resolution and precise positioning less reliable.

The rover-reference separation constraint has made KAR positioning with a single reference receiver unsuitable for certain mobile positioning applications such as aircraft positioning for conducting aerial surveys. An aircraft on a survey mission will typically exceed this constraint. One solution is to set up multiple reference receivers along the aircraft's intended flight path so that at least one reference receiver falls within a 10 km radius of the aircraft's position. This approach can become time-consuming and expensive if the survey mission covers a large project area.

Network GNSS methods using multiple reference stations of known location allow correction terms to be extracted from the signal measurements. Those corrections can be interpolated to all locations within the network. Network KAR is a technique that can achieve centimeter-level positioning accuracy on large project areas using a network of reference GNSS receivers. This technique operated in real-time is commonly referred to as network RTK. The network KAR algorithm combines the pseudorange and carrier phase observables from the reference receivers as well as their known positions to compute calibrated spatial and temporal models of the ionospheric and tropospheric signal delays over the project area. These calibrated models provide corrections to the observables from the rover receiver, so that the rover receiver can perform reliable ambiguity resolution on combinations of carrier phase observables from the rover and some or all reference receivers. The number of reference receivers required to instrument a large project area is significantly less than what would be required to compute reliable single baseline KAR solutions at any point in the project area. See, for example, U.S. Pat. No. 5,477,458, "Network for Carrier Phase Differential GPS Corrections," and U.S. Pat. No. 5,899,957, "Carrier Phase Differential GPS Corrections Network". See also Liwen Dai et al., "Comparison of Interpolation Algorithms in Network-Based GPS Techniques," Journal of the Institute of Navigation, Vol. 50, No. 4 (Winter 2003-2004) for a comparison of different network GNSS implementations and comparisons of their respective performances.

A virtual reference station (VRS) network method is a particular implementation of a network GNSS method that is characterized by the method by which it computes corrective data for the purpose of rover position accuracy improvement. A VRS network method comprises a VRS observables generator and a single-baseline differential GNSS position generator such as a GNSS receiver with differential GNSS capability. The VRS observables generator has as input data the pseudorange and carrier phase observables on two or more frequencies from N reference receivers, each tracking signals from M GNSS satellites. The VRS observables generator outputs a single set of M pseudorange and carrier phase observables that appear to originate from a virtual reference receiver at a specified position (hereafter called the VRS position) within the boundaries of the network defined by a polygon having all or some of the N reference receivers as vertices. The dominant observables errors comprising a receiver clock error, satellite clock errors, ionospheric and tropospheric signal delay errors and noise all appear to be consistent with the VRS position. The single-baseline differential GNSS position generator implements a single-baseline differential GNSS position algorithm, of which numerous examples have been described in the literature. B. Hofmann-Wellenhof et al., *Global Positioning System: Theory and Practice, 5th Edition,* 2001 (hereinafter "Hofmann-Wellenhof [2001]"), gives comprehensive descriptions of different methods of differential GNSS position computation, ranging in accuracies from one meter to a few centimeters. The single-baseline differential GNSS position algorithm typically computes differences between the rover and reference receiver observables to cancel atmospheric delay errors and other common mode errors such as orbital and satellite clock errors. The VRS position is usually specified to be close to the roving receiver position so that the actual atmospheric errors in the roving observables approximately cancel the estimated atmospheric errors in the VRS observables in the rover-reference observables differences.

The VRS observables generator computes the synthetic observables at each sampling epoch (typically once per second) from the geometric ranges between the VRS position and the M satellite positions as computed using well-known algorithms such as given in "Navstar GPS Space Segment/Navigation User Interface," ICD-GPS-200C-005R1, 14 Jan. 2003 (hereinafter "ICD-GPS-200"). It estimates the typical pseudorange and phase errors comprising receiver clock error, satellite clock errors, ionospheric and tropospheric signal delay errors and noise, applicable at the VRS position from the N sets of M observables generated by the reference receivers, and adds these to the synthetic observables.

A network RTK system operated in real time requires each receiver to transmit its observables to a network server computer that computes and transmits the corrections and other relevant data to the rover receiver. The reference receivers plus hardware to assemble and broadcast observables are typically designed for this purpose and are installed specifically for the purpose of implementing the network. Consequently, those receivers are called dedicated (network) reference receivers.

An example of a VRS network is designed and manufactured by Trimble Navigation Limited, of Sunnyvale, Calif. The VRS network as delivered by Trimble includes a number of dedicated reference stations, a VRS server, multiple server-reference receiver bi-directional communication channels, and multiple server-rover bi-directional data communication channels. Each server-rover bi-directional communication channel serves one rover. The reference stations provide their observables to the VRS server via the server-reference receiver bi-directional communication channels. These channels can be implemented by a public network such as the Internet. The bi-directional server-rover communication channels can be radio modems or cellular telephone links, depending on the location of the server with respect to the rover.

The VRS server combines the observables from the dedicated reference receivers to compute a set of synthetic observables at the VRS position and broadcasts these plus the VRS position in a standard differential GNSS (DGNSS) message format, such as RTCM, RTCA or CMR. The synthetic observables are the observables that a reference receiver located at the VRS position would measure. The VRS position is selected to be close to the rover position so that the rover-VRS separation is less than a maximum separation considered acceptable for the application. Consequently, the rover receiver must periodically transmit its approximate position to the VRS server. The main reason for this particular implementation of a real-time network RTK system is compatibility with RTK survey GNSS receivers that are designed to operate with a single reference receiver.

Descriptions of the VRS technique are provided in U.S. Pat. No. 6,324,473 of Eschenbach (hereinafter "Eschenbach") (see particularly col. 7, line 21 et seq.) and U.S. Patent application publication no. 2005/0064878, of B. O'Meagher (hereinafter "O'Meagher"), which are assigned to Trimble Navigation Limited; and in H. Landau et al., *Virtual Reference Stations versus Broadcast Solutions in Network RTK,* GNSS 2003 Proceedings, Graz, Austria (2003); each of which is incorporated herein by reference.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

Figure 1:
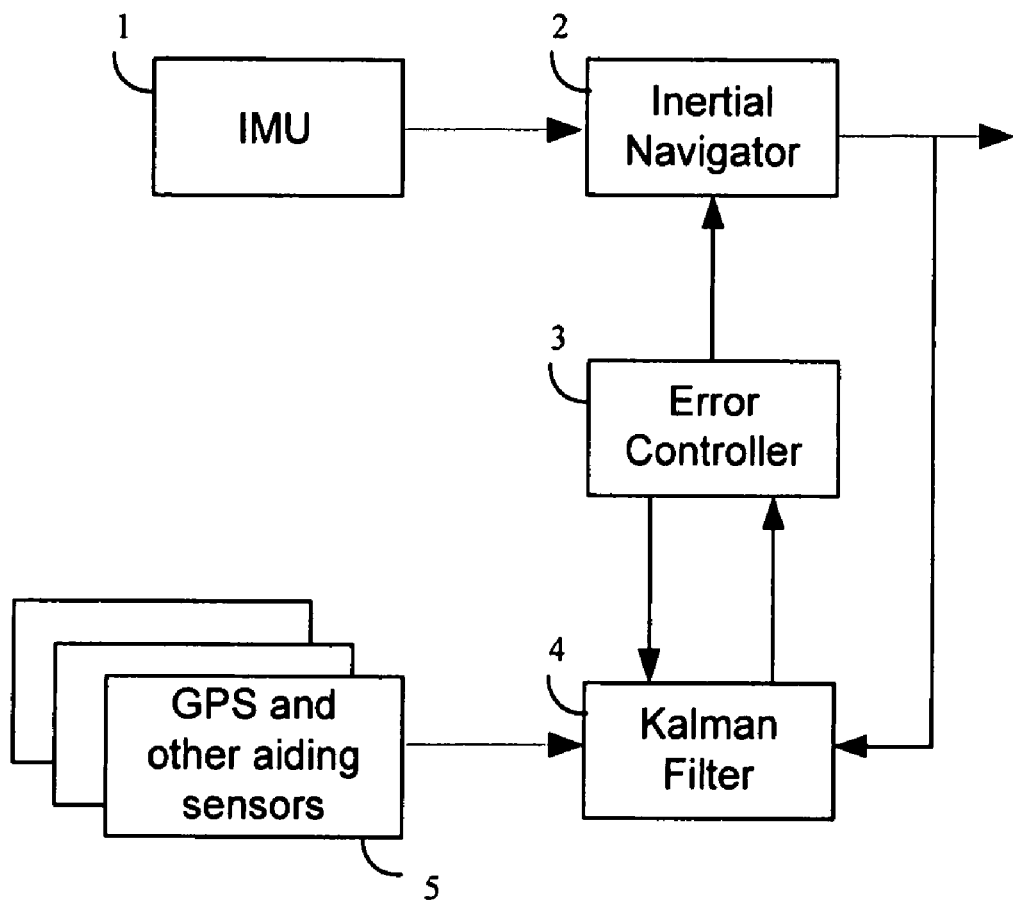
FIG. 1 illustrates a prior art AINS.

A Post-Mission High Accuracy Position and Orientation System (PM-HAPOS) is described below. Note that references in this document to "an embodiment", "one embodiment", or the like, mean that the particular feature, structure or characteristic being described is included in at least one embodiment of the present invention. Occurrences of such phrases in this specification do not necessarily all refer to the same embodiment.

The PM-HAPOS introduced here includes processing software and circuitry to implement a GNSS-AINS integrated with a network GNSS solution. A network of GNSS reference receivers that surround the mobile platform trajectory ("project area") is used to overcome the limitation on baseline length. The techniques introduced here use an implementation of inertially-aided RTK (IARTK) with GNSS. IARTK integrates the AINS Kalman filter and RTK engine, which has the benefit of significantly accelerating the ambiguity resolution process (e.g., from a typical 15-30 seconds to fix, to about 1 second) without compromising reliability. The PM-HAPOS operates on data recorded during one or more survey missions, and therefore includes a post-mission subsystem (e.g., a software package) that implements a GNSS-AINS integrated with a network GNSS solution. A particular embodiment described below implements a GNSS-AINS capable of processing reference observables from multiple reference receivers with a VRS algorithm.

The term "VRS", as used henceforth in this document, is used as shorthand to refer to any system or technique which has the characteristics and functionality of VRS described or referenced herein and is not necessarily limited to a system from Trimble Navigation Ltd. Hence, the term "VRS" is used in this document merely to facilitate description and is used without derogation to any trademark rights of Trimble Navigation Ltd. or any subsidiary thereof or other related entity.

Two possible applications of the PM-HAPOS introduced here are aerial photogrammetry and laser altimetry. Both applications require accurate position and orientation time histories of a camera or LIDAR to assign geographic position coordinates to the image pixels or laser ground spots, a process known as georeferencing. One advantage of using the PM-HAPOS introduced here in these applications is that a large project area can be instrumented with a few reference receivers that are located inside the project area or near its perimeter. For example, a project area with dimensions 100 km×100 km can be instrumented with as few as four reference receivers evenly distributed around the perimeter of the project area. These can be dedicated receivers or permanent receivers.

The PM-HAPOS introduced here can achieve several important performance attributes that previous GNSS-AINS implementations cannot achieve. These include:

1) Providing positioning with accuracy in the range of a few centimeters over large project areas in which the shortest baseline to a reference receiver is always long, i.e., greater than 20 kilometers.

2) Allowing for fast and reliable recovery of this positioning accuracy (e.g., within about 1 to 2 seconds) following a loss of rover GNSS signal outage. Such signal outages tend to occur on an aircraft engaged in a survey mission when the aircraft executes a high bank-angle turn from one survey line to the next. Typical survey trajectories include many parallel survey lines joined by 180-degree turns; consequently, these signal outages can occur frequently. Sharp turns provide the most economical execution of a survey mission. Previous GNSS-AINS implementations for this application required the pilot to fly flat turns with low bank angles to maintain the rover GNSS antenna orientation toward the sky and thereby no signal loss. Such flat turns required significantly longer times to execute than sharp turns, resulting in additional aircraft operation expenses.

It is to be noted that the techniques introduced here are not necessarily limited to these applications.

In this description, the terms "rover" and "mobile platform" are used interchangeably to refer to a vehicle that carries the survey sensors during a mobile survey/mapping mission. It is noted, however, that in other embodiments, the mobile platform or rover need not be a vehicle; for example, it could be a person.

The techniques introduced here use a network of GNSS reference receivers that surround the project area, to overcome the limitation on baseline length. These reference receivers can be a combination of dedicated reference receivers installed by the user and/or permanent receivers that are part of a network installed by some other agency, such as a local or national government for some other purpose such as earthquake detection or atmospheric research. Examples of such permanent receiver networks are the Continuously Operating Reference System (CORS) and the International GNSS System (IGS). Typically these permanent receivers provide access and data download via the Internet to the general public or to service subscribers.

Figure 8:
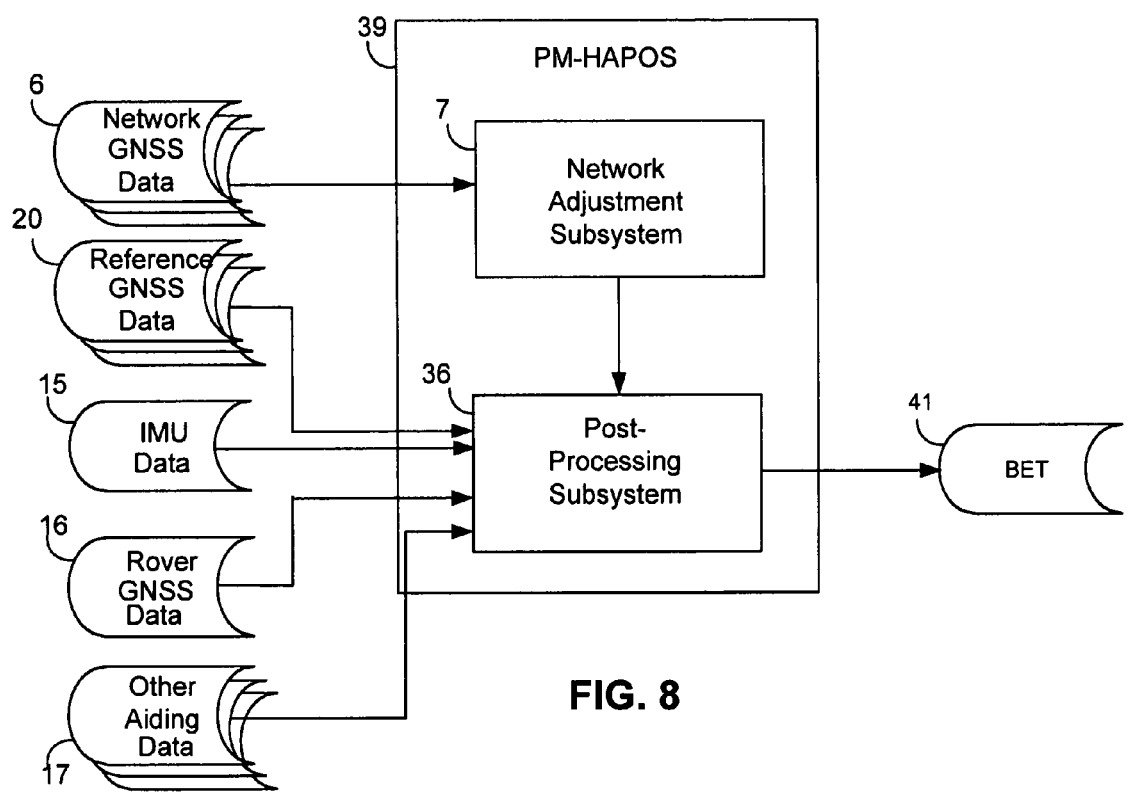
FIG. 8 shows an embodiment of the PM-HAPOS.

In at least one embodiment, the PM-HAPOS includes a network adjustment subsystem 7 and a post-processing subsystem 36, as shown in FIG. 8. The network adjustment subsystem 7 and post-processing subsystem 36 may be implemented in a single package or product 39, such as a software application that can be run on a conventional personal computer or server-class computer.

As described further below, the network adjustment subsystem 7 evaluates and corrects published antenna positions 6 for selected GNSS reference receivers. The post-processing subsystem 36 operates on data 20 acquired from the network of GNSS reference receivers as well as IMU data 15, rover GNSS data 16 and other aiding data 17 previously acquired and recorded during a mobile mapping/survey mission by a GNSS-AINS vehicle subsystem on the vehicle that carries the survey sensor. The output of the PM-HAPOS is a best estimate of trajectory (BET) 41, which is a highly accurate position and orientation solution for the mobile platform over the duration of the mapping/survey mission.

Figure 2:
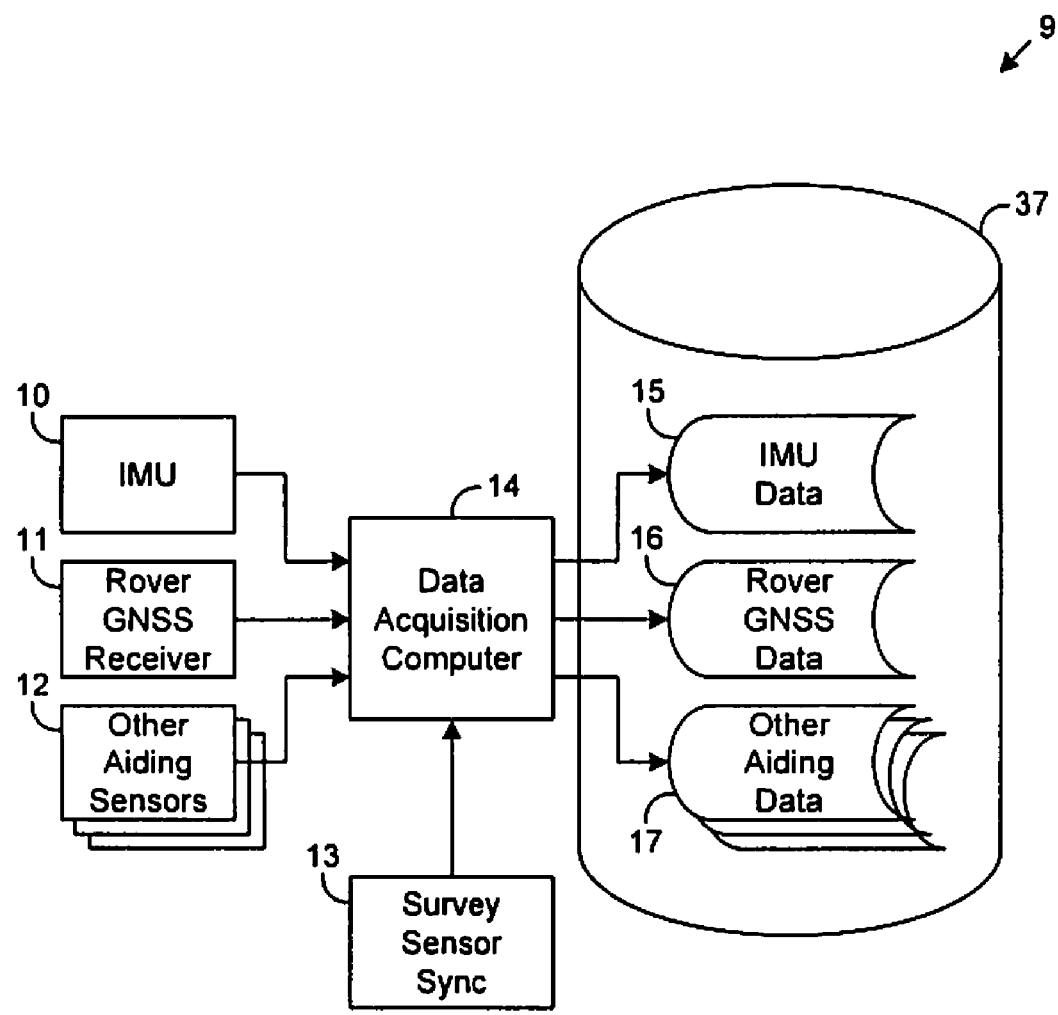
FIG. 2 shows a GNSS-AINS vehicle subsystem that may be used to acquire data for the PM-HAPOS.

FIG. 2 shows an example of the vehicle subsystem. The purpose of the vehicle subsystem 9 is to record IMU data, rover GNSS receiver data and possibly other aiding sensor data that are synchronized with the survey sensor data. If, for example, the vehicle is an aircraft and the survey sensor is an aerial camera, then the vehicle subsystem records IMU and rover GNSS data for the duration of an aerial photogrammetry mission, referred to as the "data acquisition period".

The vehicle subsystem 9 includes an IMU 10 mounted on or near the survey sensor so as to measure the sensor's accelerations and angular rates. The vehicle subsystem 9 further includes the rover GNSS receiver 11 and antenna and possibly other aiding sensors 12. The rover GNSS receiver 11 and antenna are an aiding sensor. The other aiding sensors 12 may include, for example, any one or more of the following: an odometer on a land vehicle that measures the distance traveled; a two-antenna GNSS compass that measures vehicle heading; a magnetic compass that measures vehicle heading; a laser distance meter that measures one or more distances to a fixed position; another position sensor such as a LORAN-C receiver; another velocity sensor such as a speed log on a ship or boat.

The vehicle subsystem 9 further includes a synchronization device 13 that generates a survey sensor synchronization signal. For example, on an aerial camera, the synchronization device 13 could be a mid-exposure pulse generator.

The vehicle subsystem 9 further includes a data acquisition computer 14 that receives the data streams from the IMU 10, GNSS receiver 11 and other aiding sensors 12, and records these to data files 15, 16 and 17, respectively, on one or more mass storage devices 37, such as one or more disk drives and/or flash memory cards. The data acquisition computer 14 can be part of a system with other functionality. For example, the data acquisition function can be part of an Applanix Position and Orientation System (POS), available from Trimble Navigation Limited, which also computes a real-time position and orientation solution.

Figure 3:
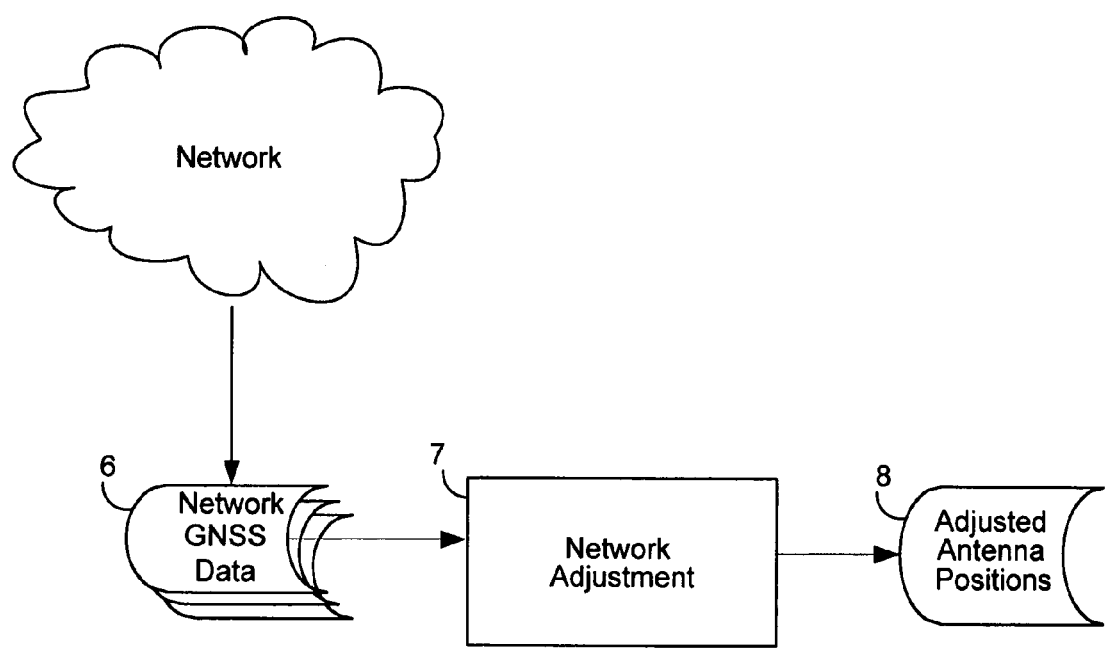
FIG. 3 illustrates the network adjustment subsystem of the Post-Mission High Accuracy Position and Orientation System (PM-HAPOS)

FIG. 3 illustrates the network adjustment subsystem. The network adjustment subsystem 7 can be (or operate within), for example, a personal computer or server-class computer that runs network adjustment software. The network adjustment software evaluates and possibly corrects the published antenna positions for selected reference receivers (not shown), which may be permanent and/or dedicated reference receivers. The network adjustment software inputs an array of files 6 of GNSS reference receiver observables, which may be downloaded from a publicly accessible source over a network such as the Internet. Based on the input files 6, the network adjustment software computes the relative positions of the antennas of the reference receivers and stores these positions in a file 8. To accomplish this, the network adjustment software can implement any one of a number of well-known, conventional algorithms currently used for network adjustment of static GNSS receivers. The file 8 may include an assessment of data quality that a network adjustment typically generates.

Figure 4:
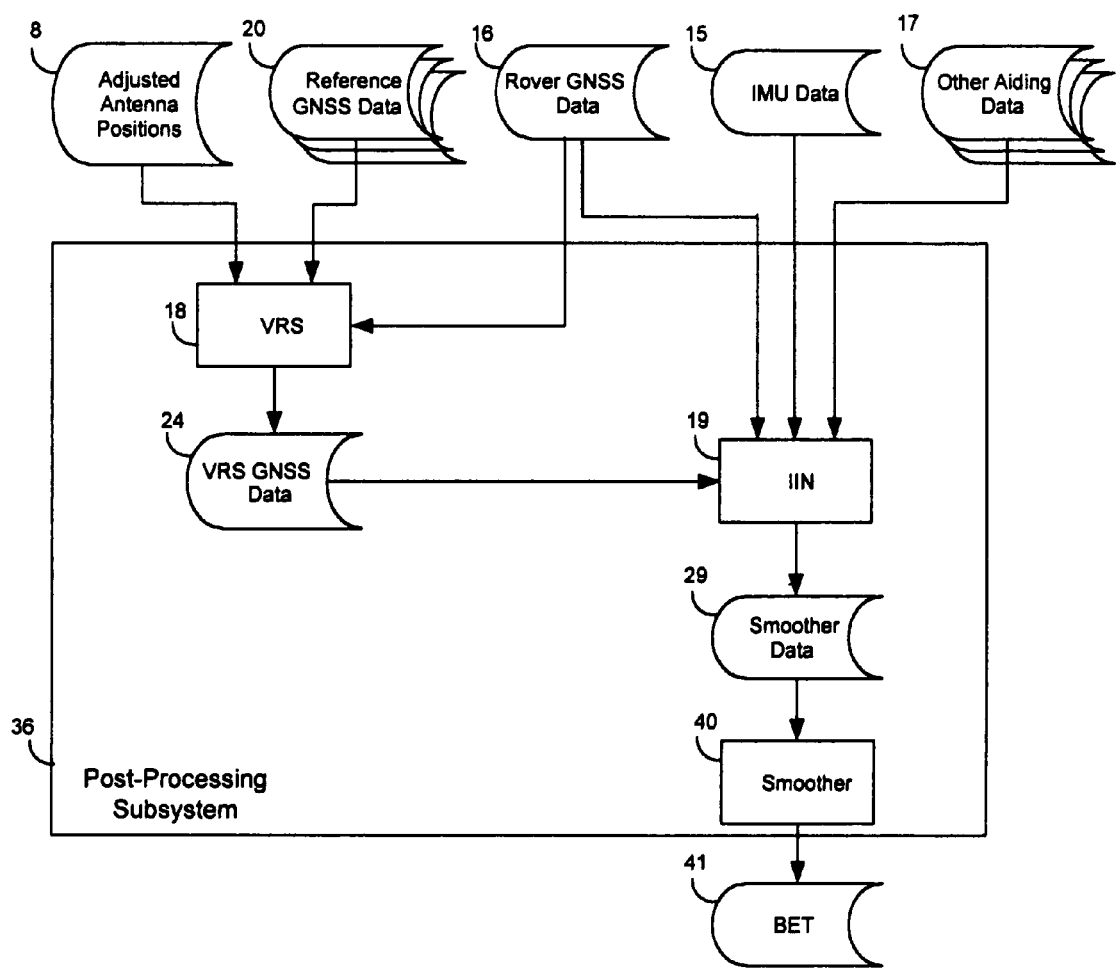
FIG. 4 shows the post-processing subsystem of the PM-HAPOS.

FIG. 4 shows an example of the post-processing subsystem 36 of the PM-HAPOS. The post-processing subsystem 36 can be (or can operate within), for example, a personal computer, a server-class computer, or a set of two or more such computers on a network, which runs GNSS-AINS post-processing software. The post-processing software includes the following modules, which can be executed by one or more programmable general-purpose microprocessors: a VRS module 18, an integrated inertial navigation (IIN) module 19, and a smoother module 40. Note that in other embodiments, one or more of these modules, or portions thereof, can be implemented in the form of specially-designed hardware circuitry, such as one or more application specific integrated circuits (ASICs), programmable logic devices (PLDs), programmable gate arrays (PGAs), or the like.

As noted above, the rover GNSS receiver 11 is an aiding sensor. A reference GNSS receiver allows the Kalman filter in the IIN 19 to compute differential GNSS observables and thereby cancel the dominant errors in the rover GNSS observables. An AINS using differential GNSS observables generates a more accurate AINS navigation solution than it could by using uncorrected GNSS observables. In the technique introduced here, the VRS module 18 receives and uses reference GNSS observables from multiple fixed-location GNSS reference receivers distributed around the project area. The VRS module 18 may implement the VRS technique described by Eschenbach and O'Meagher (mentioned above). Note that VRS software which implements that technique can operate with any set of reference receiver observables, including permanent reference receiver observables. The rover GNSS data 16 and VRS GNSS data 24 are fed to the Kalman filter in the IIN 19 for the purpose of obtaining good control of the inertial navigation errors, to thereby generate an accurate navigation solution.

The VRS module 18 is essentially a network KAR subsystem. It receives as input the adjusted antenna positions 8 as well as the reference GNSS data 20 and rover GNSS data 16 that were recorded during the data acquisition period (i.e., during the survey mission), and uses them to compute and output a set of VRS GNSS data 24. The IIN module 19 inputs the VRS GNSS data 24 and data files 15, 16 and 17 (the IMU data, rover GNSS data, and data from other aiding sensors, respectively), and uses them to compute and output a set of smoother data 29. The smoother 40 inputs the smoother data 29 and uses that data to compute and output a final set of high-accuracy position and orientation data 41 for the rover for the data acquisition period; this set of position and orientation data is the BET, which is a highly accurate position and orientation solution and which is the final output of the PM-HAPOS.

The VRS module 18 includes VRS server software to compute a set of "synthetic" observables, i.e., observables for a virtual reference station (VRS). In certain embodiments, the position of the virtual reference station is taken as the geographic center of the project area. Note that the rover GNSS data 16 is used by the VRS module 18 to allow it to interpolate atmospheric delays to the recorded rover positions and apply those delays to the synthetic VRS observables.

Figure 5:
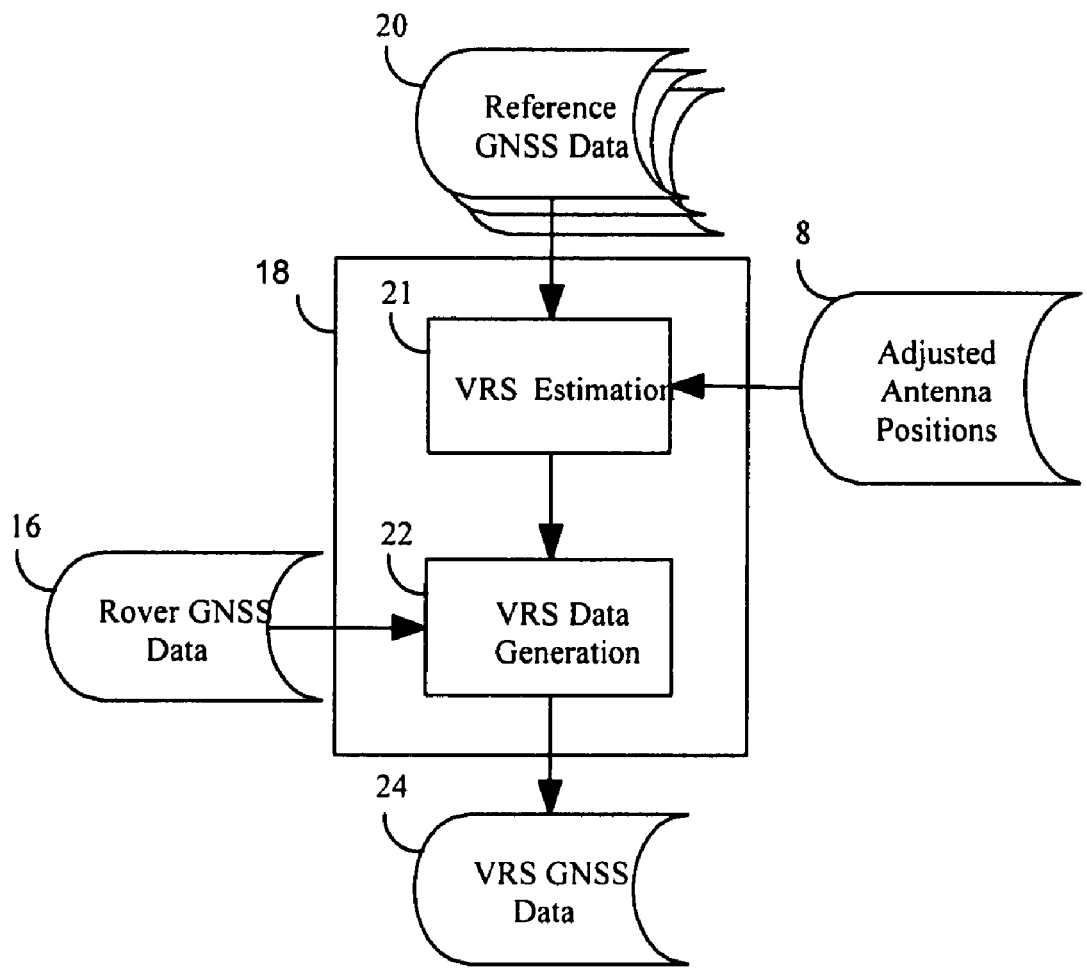
FIG. 5 shows the VRS module of the post-processing subsystem.

The VRS module 18 is further illustrated in FIG. 5. The VRS module 18 computes a set of VRS GNSS data 24, which is a file of synthetic VRS observables and the VRS antenna position (i.e., the GNSS observables and antenna position of a virtual reference station (VRS)). The VRS module 18 includes a VRS estimation module 21, and a VRS data generation module 22. The VRS estimation module 21 implements a VRS estimation algorithm (described below) that estimates the parameters required to construct the correlated errors in the VRS observables. The VRS data generation module 22 inputs the estimated parameters from the VRS estimation module and implements a VRS data generation algorithm (described below) that computes the synthetic observables at the VRS position, based on the approximate rover antenna position contained in the recorded rover GNSS data 16 and the atmospheric error model.

The following is a description of the input data 8, 16 and 20 to the VRS estimation algorithm implemented by the VRS estimation module 21. The network comprises N reference receivers whose antennas are located at positions given by the Cartesian coordinates $(x_k, y_k, z_k)$ with respect to a terrestrial reference frame, such as WGS84 for k=1, 2, ..., N. All subsequent Cartesian position coordinate specifications are given with respect to this coordinate frame, hereafter referred to as the "terrestrial reference frame". The transformation from these coordinates to any other is unique and well-defined, and therefore does not limit the generality of the algorithm.

Each receiver tracks L1 and L2 signals from M GNSS satellites. For the $m^{th}$ tracked satellite in m=1, 2, ..., M, the $n^{th}$ reference receiver in n=1, 2, ..., N generates the following observables on frequencies i=1 (L1) and 2 (L2): pseudorange observables $\beta_{n,m}^i$ and carrier phase observables $\phi_{n,m}^i$.

All reference receivers generate the same broadcast ephemeris and satellite clock parameters for all satellites tracked by the receiver. These well-known parameters are specified in ICD-GPS-200 (referenced previously) and therefore not repeated here.

The precise ephemeris and clock parameters comprise periodic satellite positions in Cartesian coordinates with respect to the terrestrial reference frame and periodic satellite clock offset and drift parameters. These are available from various agencies that include NASA's Jet Propulsion Laboratory (JPL) and the International GNSS Service (IGS).

The VRS position is specified by its terrestrial reference frame coordinates $(x_{VRS}, y_{VRS}, z_{VRS})$.

The geometry of the space segment (positions of orbiting satellites as viewed from each reference receiver) varies continuously, and the number of satellites M visible at each reference receiver changes with time t. The physical separation of any pair of reference receivers in the network is typically on the order of 10-100 km. The satellites are typically more widely dispersed, and therefore, their signals received at a given reference receiver probe largely different sections of the sky. A strong correlation between the ionospheric effects from receiver to receiver is therefore assumed, while the ionospheric effects from satellite to satellite are considered independent. Each satellite is (at this stage of processing) treated independently of the others for the entire period during which it is visible to the network. Differences between state estimates among different satellites are built later so that errors common to the satellites can be eliminated.

Figure 9:
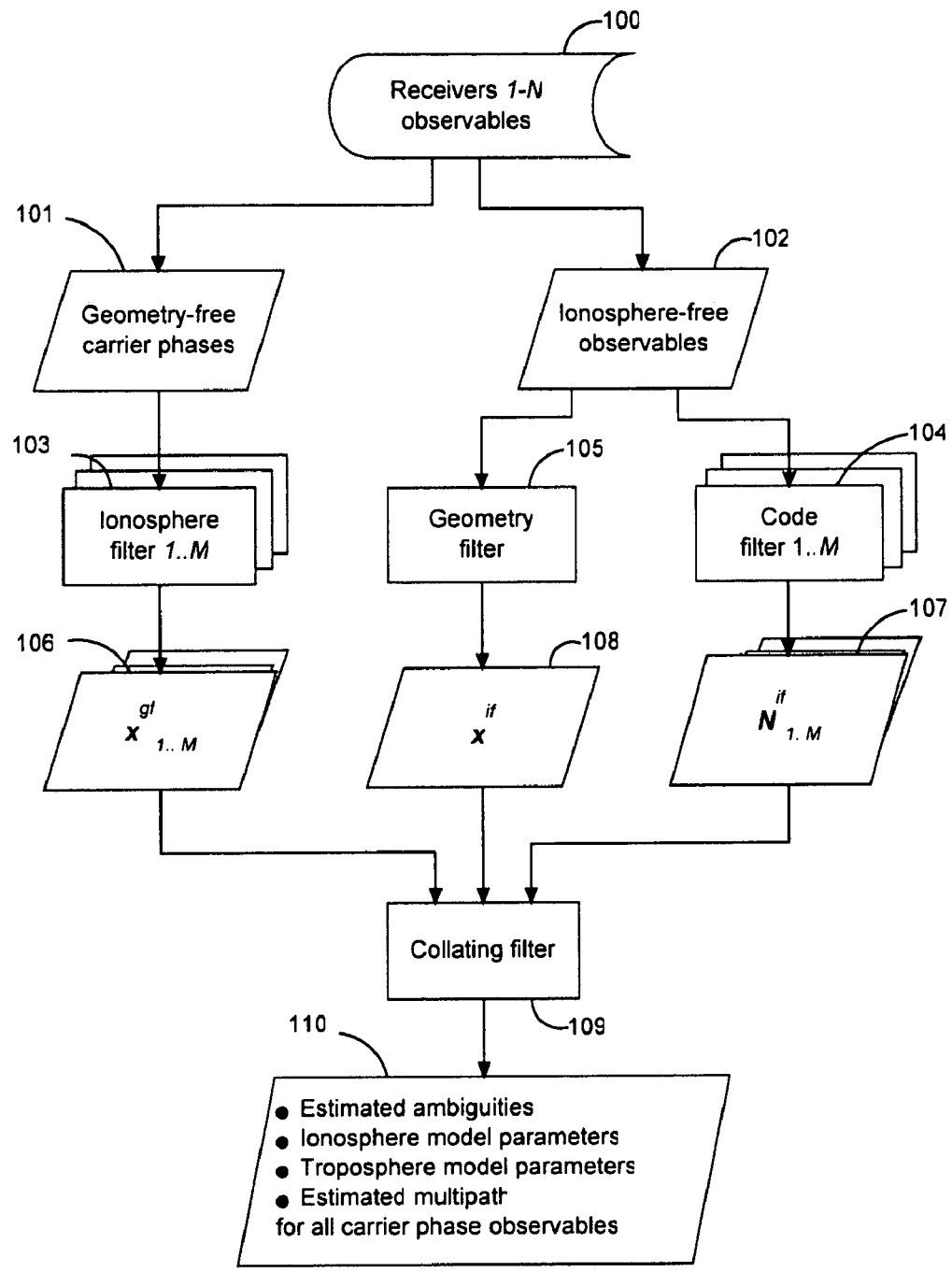
FIG. 9 shows a VRS estimation data and processing flow diagram.

The following is a description of the VRS estimation algorithm, according to an embodiment of the invention. FIG. 9 illustrates the combined VRS estimation algorithm, comprising M ionosphere filters 103, one for each of the M satellites being tracked, M code filters 104, one for each of the M satellites being tracked, one geometry filter 105, and one collating filter 109. The input data 100 to be processed at each measurement epoch comprises M sets of observables from each of N reference receivers. Each set of observables comprises L1 and L2 pseudoranges and L1 and L2 carrier phases. The VRS estimation algorithm is an embodiment of the FAMCAR algorithm described in Ulrich Vollath, *The Factorized Multi-Carrier Ambiguity Resolution (FAMCAR) Approach for Efficient Carrier Phase Ambiguity Estimation*, Proceedings of ION GNSS 2004, Long Beach Calif., 21-24 September, 2004 (hereinafter "Vollath [2004]").

The pseudorange or code observable from satellite m at carrier frequency i generated by receiver n is modeled as follows:

$$\rho_{n,m}^i = r_{n,m} + c(\delta T_n - \delta t_m) + T_{n,m} + I_{n,m}^i \delta\rho_{n,m}^{mp} + \mu_{n,m}^i \quad (1)$$

where $r_{n,m}$ is the true range or distance between receiver antenna n and satellite m, $\delta T_n$ is the receiver clock offset, $\delta t_m$ is the satellite clock offset, $T_{n,m}$ is the troposphere delay in meters, $I_{n,m}^i$ is the ionosphere group delay in meters, $\delta\rho_{n,m}^{mp}$ is the code multipath error resulting from reflections of signals in the surroundings of the receiver, and $\mu_{n,m}^i$ is the code measurement noise generated by the receiver.

The carrier phase observable from satellite m at carrier frequency i generated by receiver n is modeled as follows:

$$\phi_{n,m}^i + N_{n,m}^i = -\frac{1}{\lambda_i}(r_{n,m} + c(\delta T_n - \delta t_m) + T_{n,m} - I_{n,m}^i + MP_{n,m}^i) + \eta_{n,m}^i \quad (2)$$

where $N_{n,m}^i$ is the initial (theoretical) number of full wavelengths of the carrier frequency between reference receiver n and satellite m for a signal traveling in vacuum, $MP_{n,m}^i$ is the phase multipath error resulting from reflections of signals in the surroundings of the receiver and on the centimeter level, $\eta_{n,m}^i$ is the phase measurement noise generated by the receiver, and $\lambda_i$ is the carrier wavelength.

Equation (2) characterizes the carrier phase as the integrated Doppler frequency, so that carrier phase increases in the negative direction as the range increases. Currently Navstar GPS offers signals at two wavelengths $\lambda_1$=0.19029 m and $\lambda_2$=0.24421 m. There is a known physical relationship between the ionospheric group delay for different wavelengths, which relates the effect experienced for waves of different frequencies to a first order approximation as follows $$\frac{I_{n,m}^1}{I_{n,m}^2} = \frac{f_2^2}{f_1^2} = \frac{\lambda_1^2}{\lambda_2^2} \quad (3)$$

This approximation is fully sufficient for purposes of the technique introduced here.

The troposphere delay $T_{n,m}$, the clock offsets $\delta T_n$ and $\delta t_m$ and the true range between station and satellite $r_{n,m}$ are all independent of signal frequency. This fact can be exploited by taking the difference of the phase measurements for the station—satellite pairs to eliminate the frequency-independent parameters. From equation (2) the following geometry-free phase combination of L1 and L2 phases is obtained:

$$\phi_{n,m}^{gf} = \frac{\lambda_1^2}{\lambda_2^2 - \lambda_1^2}(\phi_{n,m}^1 \lambda_1 - \phi_{n,m}^2 \lambda_2) \quad (4)$$

$$= -N_{n,m}^{gf} + MP_{n,m}^{gf} + I_{n,m} + \varepsilon_{n,m}^{gf}$$

where $$I_{n,m} = I_{n,m}^1 \quad (5)$$

$$N_{n,m}^{gf} = \frac{\lambda_1^2}{\lambda_2^2 - \lambda_1^2}(N_{n,m}^1 \lambda_1 - N_{n,m}^2 \lambda_2) \quad (6)$$

-continued $$MP_{n,m}^{gf} = \frac{\lambda_1^2}{\lambda_2^2 - \lambda_1^2}(MP_{n,m}^1 - MP_{n,m}^2) \quad (7)$$

$$\varepsilon_{n,m}^{gf} = \frac{\lambda_1^2}{\lambda_2^2 - \lambda_1^2}(\eta_{n,m}^1 \lambda_1 - \eta_{n,m}^2 \lambda_2) \quad (8)$$

Note that $N_{n,m}^{gf}$ is not an integer and has units of distance (meters). The purpose of constructing and then processing the measurements $\phi_{n,m}^{gf}$ is to determine the parameters $N_{n,m}^{gf}$, $MP_{n,m}^{gf}$, and $I_{n,m}$ within a consistent framework and consistent error estimates.

The linear ionosphere delay model of equation (3) allows the construction of L1 and L2 code and carrier phase combinations without ionosphere delay errors as follows. The ionosphere-free pseudorange is $$\rho_{n,m}^{if} = \gamma^{if}\left(\rho_{n,m}^1 - \frac{\lambda_1^2}{\lambda_2^2}\rho_{n,m}^2\right) \quad (9)$$
$$= (r_{n,m} + c(\delta T_n - \delta t_m) + T_{n,m}) + mp_{n,m}^{if} + \mu_{n,m}^{if}$$

where $$\gamma^{if} = \frac{1}{1 - \frac{\lambda_1^2}{\lambda_2^2}} \quad (10)$$

$$mp_{n,m}^{if} = \gamma^{if}\left(mp_{n,m}^1 - \frac{\lambda_1^2}{\lambda_2^2}mp_{n,m}^2\right) \quad (11)$$

$$\mu_{n,m}^{if} = \gamma^{if}\left(\mu_{n,m}^1 - \frac{\lambda_1^2}{\lambda_2^2}\mu_{n,m}^2\right) \quad (12)$$

The ionosphere-free carrier phase is $$\phi_{n,m}^{if} = \phi_{n,m}^1 - \frac{\lambda_1}{\lambda_2}\phi_{n,m}^2 \quad (13)$$
$$= -\frac{1}{\lambda_{if}}(r_{n,m} + c(\delta T_n - \delta t_m) + T_{n,m} + MP_{n,m}^i) - N_{n,m}^{if} + \varepsilon_{n,m}^{if}$$

where $$N_{n,m}^{if} = N_{n,m}^1 - \frac{\lambda_1}{\lambda_2}N_{n,m}^2 \quad (14)$$

$$\varepsilon_{n,m}^{if} = \eta_{n,m}^1 - \frac{\lambda_1}{\lambda_2}\eta_{n,m}^2 \quad (15)$$

$$\frac{1}{\lambda_{if}} = \lambda_1\left(\frac{1}{\lambda_1^2} - \frac{1}{\lambda_2^2}\right) \iff \lambda_{if} = \frac{\lambda_1\lambda_2^2}{\lambda_2^2 - \lambda_1^2} \quad (16)$$

Note that $N_{n,m}^{if}$ is not an integer and has units of cycles. The purpose of constructing and then processing the measurements $\phi_{n,m}^{if}$ is to determine the parameters $N_{n,m}^{if}$, $MP_{n,m}^{if}$, and $T_{n,m}$ within a consistent framework and consistent error estimates.

The range-equivalent ionosphere-free carrier phase is given by $$\theta_{n,m}^{if} = -\lambda_{if}\phi_{n,m}^{if} \quad (17)$$
$$= r_{n,m} + c(\delta T_n - \delta t_m) + T_{n,m} + MP_{n,m}^i + \lambda_{if}N_{n,m}^{if} + \xi_{n,m}^{if}$$

where $\xi_{n,m}^{if} = -\lambda_{if}\varepsilon_{n,m}^{if}$.

The ionosphere-free code minus carrier observables combination is constructed to cancel geometric terms as follows:

$$\rho_{n,m}^{if} - \theta_{n,m}^{if} = (mp_{n,m}^{if} + \mu_{n,m}^{if}) - (MP_{n,m}^i + \lambda_{if}N_{n,m}^{if} + \xi_{n,m}^{if}) \quad (18)$$
$$\cong -\lambda_{if}N_{n,m}^{if} + \varepsilon_{n,m}^{if}$$

where $\epsilon_{n,m}^{if} = \mu_{n,m}^{if} - \xi_{n,m}^{if}$ and $mp_{n,m}^{if} - MP_{n,m}^i \cong 0$, i.e. code and range-equivalent phase multipaths either cancel approximately or are small enough to be neglected.

The wide-lane carrier phase is given by $$\phi_{n,m}^{wl} = \phi_{n,m}^1 - \phi_{n,m}^2 \quad (19)$$
$$= -\frac{1}{\lambda_{wl}}(r_{n,m} + c(\delta T_n - \delta t_m) + T_{n,m} - I_{n,m}^{wl} + MP_{n,m}^{wl}) + N_{n,m}^{wl} + \varepsilon_{n,m}^{wl}$$

where $$\lambda_{wl} = \frac{\lambda_2 - \lambda_1}{\lambda_1\lambda_2} \quad (20)$$

$$I_{n,m}^{wl} = \frac{\lambda_{wl}}{\lambda_1}I_{n,m}^1 - \frac{\lambda_{wl}}{\lambda_2}I_{n,m}^2 = -\frac{\lambda_2}{\lambda_1}I_{n,m}^1 \quad (21)$$

$$N_{n,m}^{wl} = N_{n,m}^1 - N_{n,m}^2 \quad (22)$$

$$MP_{n,m}^{wl} = \frac{\lambda_{wl}}{\lambda_1}MP_{n,m}^1 - \frac{\lambda_{wl}}{\lambda_2}MP_{n,m}^2 \quad (23)$$

$$\varepsilon_{n,m}^{wl} = \varepsilon_{n,m}^1 - \varepsilon_{n,m}^2 \quad (24)$$

The narrow-lane pseudorange is given by $$\rho_{n,m}^{nl} = \frac{\lambda_2\rho_{n,m}^1 + \lambda_1\rho_{n,m}^2}{\lambda_2 + \lambda_1} \quad (25)$$
$$= r_{n,m} + c(\delta T_n - \delta t_m) + T_{n,m} + \frac{\lambda_2}{\lambda_1}I_{n,m}^1 + \delta\rho_{n,m}^{mp} + \mu_{n,m}^{nl}$$

The wide-lane carrier phase minus narrow-lane pseudorange is constructed to cancel geometric terms and atmosphere delay errors.

$$\theta_{n,m}^{wl} - \rho_{n,m}^{nl} = -\lambda_{wl}N_{n,m}^{wl} + \epsilon_{n,m}^{wnl} \quad (26)$$

Where $\theta_{n,m}^{wl} = -\lambda_{wl}\phi_{n,m}^{wl}$ and $\epsilon_{n,m}^{wnl} = \delta\rho_{n,m}^{mp} + MP_{n,m}^{wl} + \mu_{n,m}^{nl} - \lambda_{wl}\varepsilon_{n,m}^{wl}$.

Ultraviolet radiation and a constant stream of particles from the sun ionize the gases of the earth's atmosphere to produce a layer of charged gases called the ionosphere. A charged gas is a dispersive medium for electromagnetic waves such as GNSS signals. To a very good approximation, the refractive index $\varepsilon$ for an electromagnetic wave of frequency f (in units of 1/second) is given as $$\varepsilon \approx 1 - 40.3 \frac{n_e}{f^2} \quad (27)$$

where $n_e$ is the free electron density in the gas in units of $1/m^3$. The approximate constant 40.3 arises from a combination of natural constants such as electron mass, electron charge, etc. The result is a phase group delay and carrier phase advance of a modulated radio wave that penetrates the charged gas of $$\Delta \tau = -\frac{1}{c} \frac{40.3}{f^2} \int_r^s n_e \, dl \quad (28)$$

compared to the same signal traveling in a vacuum with refraction index $\varepsilon_{vac}=1$, where the integral runs over the pathway that connects reference-station receiver r and satellite s. The integral expression is commonly referred to as the "Total Electron Content" (TEC). Expressed in units of meters (after multiplication by the speed of light), the relationship between ionospheric group delay/phase advance and total electron content is $$I = 40.3 \frac{TEC}{f^2} \quad (29)$$

The electron density of the ionosphere is known to have a pronounced maximum at an altitude of approximately 350 kilometers above ground. D. Bilitza, *International Reference Ionosphere* 2000, Radio Science 2 (36) 2001, 261 (hereinafter Bilitza [2001]) provides a detailed description. For this reason, the commonly called "lumped two-dimensional (2D) model" assigns the complete ionospheric effect to a thin shell surrounding the earth at this altitude. This is described first herein as an introduction to the subsequent model used by the VRS algorithm.

Figure 10:
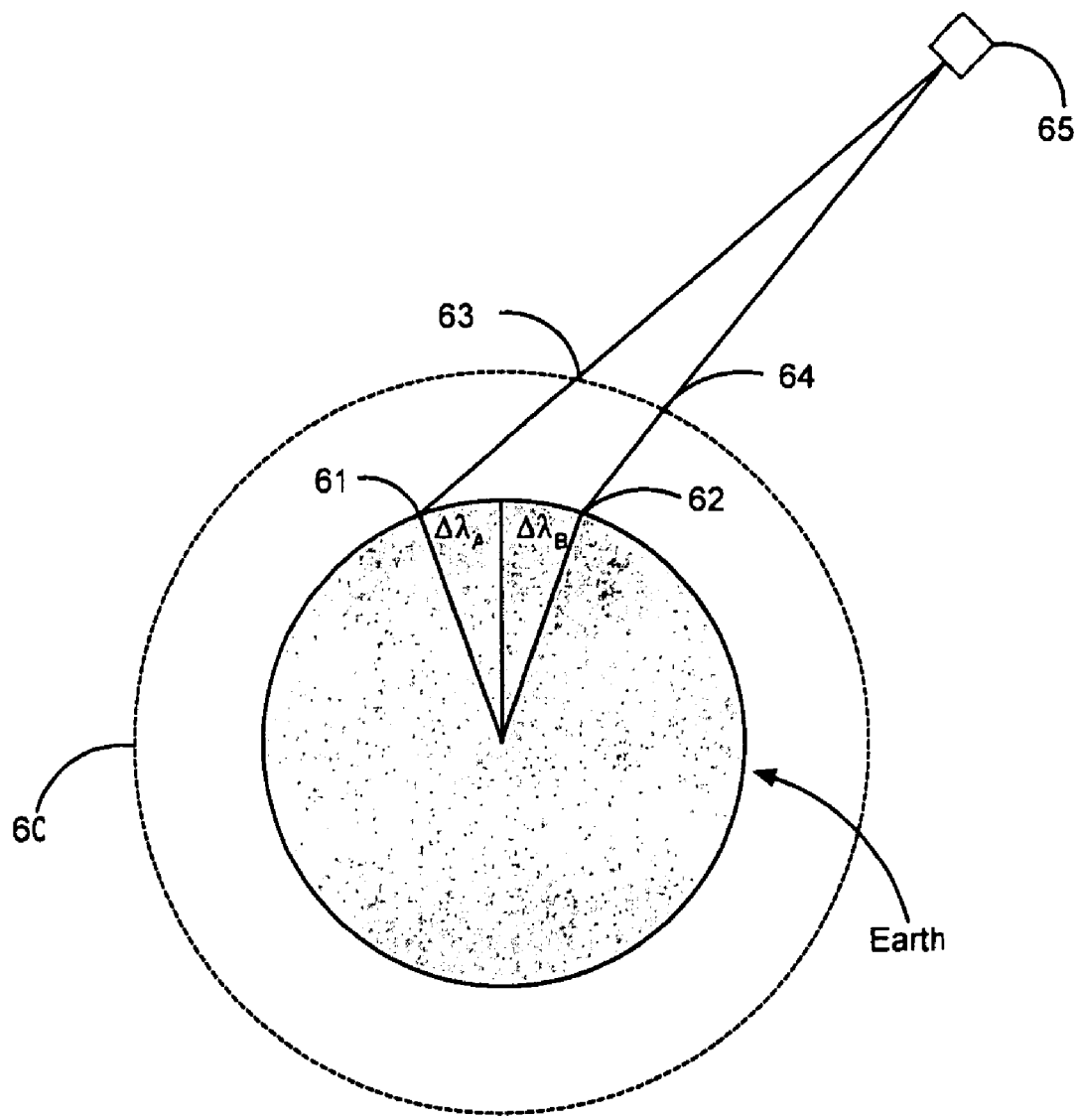
FIG. 10 shows an ionosphere delay shell model cross-section for one satellite and two GNSS receivers.
Figure 11:
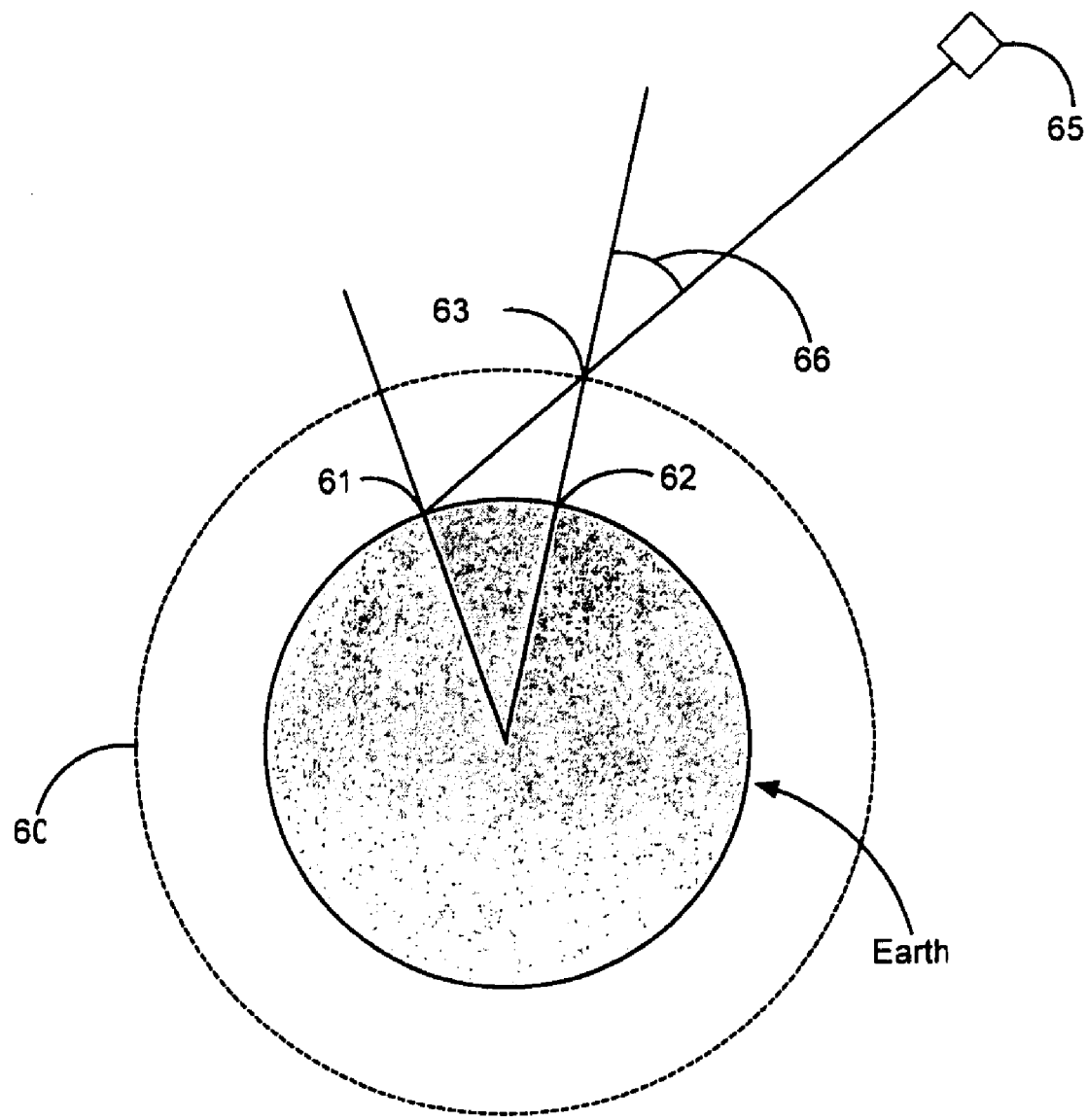
FIG. 11 shows the same ionosphere delay shell model cross-section for one satellite and one GNSS receiver with the zenith angle used in the ionosphere delay model.

FIG. 10 shows a simplified cross-sectional view of a lumped 2D ionosphere model with two signal paths from a single satellite 65 to receivers A 61 and B 62 that pierce the ionosphere shell 60 at pierce points A 63 and B 64. The latitude displacements of receivers A and B positions from a reference position between the receivers are $\Delta\lambda_A$ and $\Delta\lambda_B$. The slant ionosphere delay at pierce points A and B are $I_{A,1}$ and $I_{B,1}$. A similar drawing can be made for longitudinal displaced receivers. FIG. 11 shows a simplified cross-sectional view of a lumped 2D ionosphere model with one signal path from a single satellite 65 to a receiver 61. The angle between the satellite 65 to receiver 61 line of sight and a radial from the earth centre through the ionosphere pierce point 63 is the zenith angle 66. This arrangement is generalized to N receivers having relative latitude and longitude displacements $(\Delta\lambda_n, \Delta L_n)$, n=1, 2, . . . , N, and M pierce points per receiver corresponding to the M satellites tracked by each receiver, each pierce point modeling the lumped ionospheric delay $I_{n,m}$ for m=1, 2, . . . , M. A spatial model for these ionospheric delays derived from a first-order truncation of a spherical harmonic expansion is $$I_{n,m} = m_{n,m}^{iono}(I_{0,m} + a_m \Delta\lambda_n + b_m \Delta L_n) \quad (30)$$

where $I_{0,m}$ is the zenith ionospheric delay at a pierce point associated with the reference position for satellite m, $a_m$ is the latitude scale on zenith ionospheric delays for satellite m, $b_m$ is the latitude scale on zenith ionospheric delays for satellite m, $m_{n,m}^{iono}$ is a mapping function that maps the zenith ionospheric delay at the n,m pierce point to the ionospheric delay along the slanted signal path, given by $$m_{n,m}^{iono} = \frac{1}{\cos\varphi_{n,m}} \quad (31)$$

where $\phi_{n,m}$ is the zenith angle at the pierce point associated with receiver n and satellite m.

For each satellite m in view equation (30) contains parameters $(I_{0,m}, a_m, b_m)$ to characterize the ionosphere across the network area. These parameters together with the carrier-phase integer ambiguity and multipath states are to be estimated. The other terms $(m_{n,m}^{iono}, \Delta\lambda_n, \Delta L_n)$ in equation (30) are deterministic quantities given by the geometry of the network and the position of satellite m. Knowledge of these parameters allows equation (30) to the slant ionospheric delay $I_{r,m}$ to be predicted at any roving receiver position r in the network.

The linear model given by equation (30) can be improved by taking account of the ionosphere thickness as described in Bilitza [2001] (referenced previously).

Figure 12:
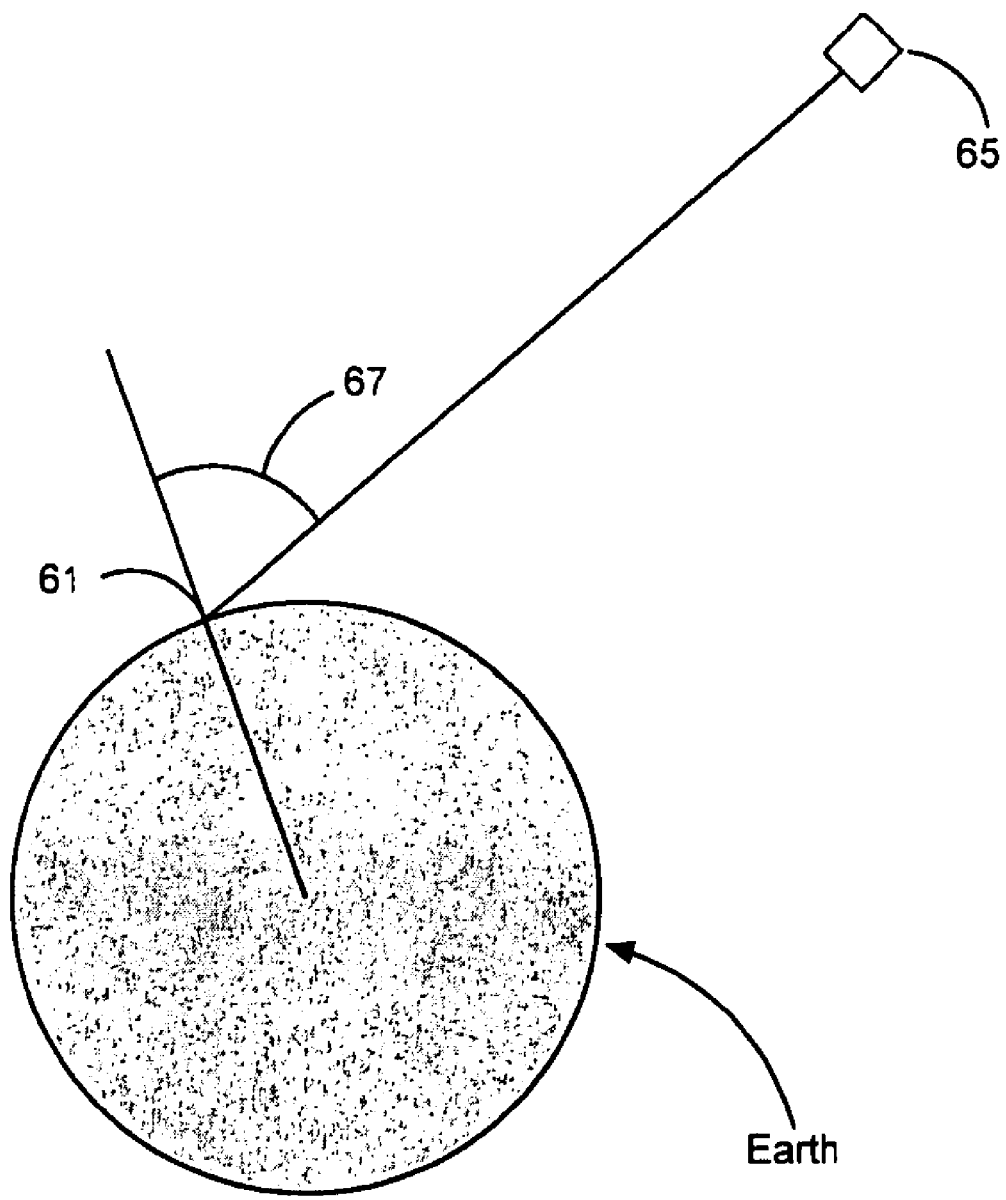
FIG. 12 shows the zenith angle at the receiver position that is used in the troposphere delay model.

There are several different methods by which the troposphere delay along a slant signal path can be modeled for the purpose of estimating the delay in a least-squares estimation process. Hofmann-Wellenhof [2001] (referenced previously) provides a description of the theory behind various predictive models such as the Hopfield model. Most of these models comprise a model for the zenith troposphere delay at a given position multiplied by a mapping function that is a function of the zenith angle 67 of the satellite 65 at the receiver position 65 as shown in FIG. 12. The predicted slant troposphere delay along a signal path from satellite m to receiver n is $$\hat{T}_{n,m} = (1 + m_{n,m}^{tropo}) T_{n,0} \quad (32)$$

where $T_{n,0}$ is the zenith troposphere delay at receiver n, $m_{n,m}^{tropo}$ is the troposphere delay mapping function.

Hofmann-Wellenhof [2001] (referenced previously) provides examples of different mapping functions. This algorithm specification is not dependent on which troposphere model or mapping function is implemented.

The predicted slant troposphere delay is then assumed to differ from the actual delay at each reference receiver by a scale factor $S_n$ that lumps the different sources of prediction error for all satellite signal paths, as follows:

$$T_{n,m} = (1+S_n)\hat{T}_{n,m} \quad (33)$$

Given a set of troposphere scale factors $S_1, \ldots, S_N$ applicable at the N reference receiver positions, the following linear spatial interpolation model is used to construct the troposphere delay error at any position in the network.

$$S_r = (S_0 + c\Delta\lambda_r + d\Delta L_r) \quad (34)$$

The parameters $S_0$, c and d are determined from a least-squares adjustment of the over-determined set of linear equations using any statistical information on $S_1, \ldots, S_N$ that may be available to weight the adjustment.

$$\begin{bmatrix} S_1 \\ \vdots \\ S_N \end{bmatrix} = \begin{bmatrix} 1 & \Delta\lambda_1 & \Delta L_1 \\ \vdots & \vdots & \vdots \\ 1 & \Delta\lambda_N & \Delta L_N \end{bmatrix} \begin{bmatrix} S_0 \\ c \\ d \end{bmatrix} \quad (35)$$

The troposphere delay at any position r in the network is then computed as $$T_{r,m} = (1S_0 + c\Delta\lambda_r + d\Delta L)\hat{T}_{n,m} \quad (36)$$

A set of M ionosphere filters 103 in FIG. 9 estimate the parameters ($I_{0,m}$, $a_m$, $b_m$) for each satellite m in 1, 2, ..., M that is visible to the network of N reference receivers. The ionosphere filtering algorithm comprises a standard Kalman filter, which is the optimal minimum variance estimator for a stochastic process given by the following general equations:

$$\vec{x}_k = \Phi_{k,k-1}\vec{x}_{k-1} + \vec{\mu}_k E[\vec{\mu}_k\vec{\mu}_k^T] = Q_k \quad (37)$$

$$\vec{z}_k = H_k\vec{x}_k + \vec{\eta}_k E[\vec{\eta}_k\vec{\eta}_k^T] = R_k \quad (38)$$

where $\vec{x}_k$ is the state vector, $\Phi_{k,k-1}$ is the state transition matrix, $Q_k$ is the process noise covariance, $\vec{z}_k$ is the measurement vector, $H_k$ is the measurement matrix, and $R_k$ is the measurement noise covariance. Equation (37) comprises the state dynamics equation, and Equation (38) comprises the measurement equation. The Kalman filter algorithm is described in numerous references, of which A. Gelb (editor), *Applied Optimal Estimation*, MIT Press, 1992 (hereinafter "Gelb [1992]") is an example.

The state vector containing the state variables to be estimated for each satellite m in 1, 2, ..., M is given by $$\vec{x}_m^{gf} = [N_{1,m}^{gf} \ldots N_{N,m}^{gf} | MP_{1,m}^{gf} \ldots MP_{N,m}^{gf} | I_{0,m} a_m b_m]^T \quad (39)$$

where $N_{1,m}^{gf}, \ldots, N_{N,m}^{gf}$ are the geometry-free combination of ambiguities given in (6), $MP_{1,m}^{gf}, \ldots, MP_{N,m}^{gf}$ are the multipath errors given in (7), $I_{0,m}$ is the ionospheric delay at the network reference position, $a_m$, $b_m$ are the ionosphere delay gradients in the latitude and longitude directions from the reference position.

The state transition matrix is given by $$\Phi_{k,k-1} = \begin{pmatrix} I_{N\times N} & & \\ & e^{-\Delta t/\tau_{MP}} I_{N\times N} & \\ & & \begin{matrix} 1 & \Delta\lambda_{CPP} & \Delta L_{CPP} \\ 0 & 1 & 0 \\ 0 & 0 & 1 \end{matrix} \end{pmatrix} \quad (40)$$

where $\Delta\lambda_{CPP}$ and $\Delta L_{CPP}$ are the latitude and longitude changes in the network reference position, $\tau_{MP}$ is the correlation time of a Gauss-Markov model for the multipath error, and $\Delta t = t_k - t_{k-1}$ is the Kalman filter iteration epoch corresponding to the GPS observables epoch.

The process noise covariance is given by $$Q_k = \begin{pmatrix} 0_{N\times N} & & \\ & \sigma_{MP}^2(1-e^{-2\Delta t/\tau_{MP}})I_{N\times N} & \\ & & \begin{matrix} q_I & 0 & 0 \\ 0 & q_\lambda & 0 \\ 0 & 0 & q_L \end{matrix} \end{pmatrix} \quad (41)$$

where $\sigma_{MP}$ is the multipath error uncertainty standard deviation, and $q_I$, $q_\lambda$ and $q_L$ are process noise spectral densities for state vector elements $I_{0,m}$, $a_m$ and $b_m$. $\sigma_{MP}$ can be a constant or scaled by $1/\sin(\phi_{n,m})$ as part of model tuning to achieve good performance. $q_I$, $q_\lambda$ and $q_L$ relate to the velocity with which the pierce points travel across the ionosphere, and again are determined by model tuning for best performance.

The measurement vector contains the geometry-free phases (4) as follows:

$$\vec{z}_m = [\phi_{1,m}^{gf} \ldots \phi_{N,m}^{gf}]^T \quad (42)$$

The measurement model matrix is given by $$H_k = \begin{pmatrix} -I_{N\times N} & I_{N\times N} & \begin{matrix} m_{1,m} & m_{1,m}\Delta\lambda_1 & m_{1,m}\Delta L_1 \\ \vdots & \vdots & \vdots \\ m_{N,m} & m_{N,m}\Delta\lambda_N & m_{N,m}\Delta L_N \end{matrix} \end{pmatrix} \quad (43)$$

where $m_{n,m}$ are the mapping functions given by (31). $R_k$ is generally a diagonal matrix whose measurement noise variances are again determined as part of a tuning process.

A set of M code filters 104 in FIG. 9 is used to estimate the N×M wide-lane floated ambiguities defined by equation (22) from wide-lane carrier minus narrow-lane code measurements (26). Each code filter implements a Kalman filter algorithm with the following state dynamics model and measurements. The state vector for each code filter is $$N_m^{wl} = [N_{1,m}^{wl} \ldots N_{N,m}^{wl}]^T \quad (44)$$

The state transition matrix is $$\Phi = I_{N\times N} \quad (45)$$

The process noise covariance is $$Q = q_N \Delta t \times I_{N\times N} \quad (46)$$

where $q_N$ is the spectral density of a random walk model for the floated ambiguities.

The code filter measurement for satellite m and receiver n is $$Z_{n,m}^{cf} = \theta_{n,m}^{wl} - \rho_{n,m}^{nl} \quad (47)$$

The measurement model is given by $$Z_{n,m}^{cf} = -\lambda_{wl} N_{n,m}^{wl} + \epsilon_{n,m}^{wnl} \quad (48)$$

The complete measurement vector is thus constructed as follows:

$$\vec{z}^{cf} = [z_{1,m}^{cf} \ldots z_{N,m}^{cf}]^T \quad (49)$$

and the measurement model matrix and measurement noise covariance matrix are constructed from (48) to be compatible with the measurement vector (49).

A geometry filter 105 in FIG. 9 is used to estimate the troposphere scale factors as well as other errors present in the ionosphere-free carrier phase observables. The geometry filter implements the Kalman filter algorithm with the following state dynamics model and measurements. The state vector is $$\vec{x}^{if} = [S \delta T \vec{N}^{if} \delta \vec{t} \delta \vec{r}_s]^T \quad (50)$$

where
  $S = [S_1 \ldots S_N]^T$ is a vector of tropo-scaling states for each of N reference receivers,
  $\delta T = [\delta T_1 \ldots \delta T_N]^T$ is a vector of N reference receiver clock offsets,
  $\vec{N}^{if} = [N_{1,1}^{if} \ldots N_{1,m}^{if} \ldots N_{N,1}^{if} \ldots N_{N,M}^{if}]^T$ is a vector of ionosphere-free ambiguities for N receivers and M satellites,
  $\delta \vec{t} = [\delta t_1 \ldots \delta t_M]^T$ is a vector of M satellite clock offsets,
  $\delta \vec{r}_s = [\delta \vec{r}_1 \ldots \delta \vec{r}_M]^T$ is a vector of M satellite orbital errors.

The state transition matrix is a block diagonal matrix given by $$\Phi = \text{diag}[I_{N \times N} I_{N \times N} I_{MN \times MN} I_{M \times M} e^{-\Delta t / \tau_{oe}} I_{3M \times 3M}] \quad (51)$$

where $\tau_{oe}$ is the correlation time of a Gauss-Markov model for the orbital error components. The process noise covariance matrix is a block diagonal matrix given by $$Q = \text{diag}[q_{ts} \Delta t \times I_{N \times N} 0_{N \times N} 0_{MN \times MN} 0_{M \times M} \sigma_{oe}^2 (1 - e^{-2\Delta t / \tau_{oe}}) I_{3M \times 3M}] \quad (52)$$

where $q_{ts}$ is the spectral density of a random walk model for the troposphere scale factor parameters, and $\sigma_{oe}$ is the initial uncertainty standard deviation of the orbital error components.

The geometry filter constructs measurements from the range-equivalent ionosphere-free carrier phases given by (17) and the ionosphere-free code minus carrier observables combinations given by (18). The ionosphere-free carrier phase measurement from satellite m and receiver n at a given measurement epoch is given as follows:

$$z_{n,m}^{ifcp} = \theta_{n,m}^{if} - \hat{T}_{n,m} - \hat{r}_{n,m} \quad (53)$$

where $\hat{r}_{n,m}$ is the computed range from the computed position of satellite m at the measurement epoch and the known receiver n antenna position, and $\hat{T}_{n,m}$ is a predicted troposphere signal delay from satellite m and receiver n. The measurement model is $$\hat{z}_{n,m}^{ifcp} = \begin{bmatrix} \hat{T}_{n,m} & 1 & \lambda_{if} & -1 & \frac{\partial \theta_{n,m}^{if}}{\partial \delta \vec{r}_m} \end{bmatrix} \begin{bmatrix} S_n \\ \delta T_n \\ N_{n,m}^{if} \\ \delta t_m \\ \delta \vec{r}_m \end{bmatrix} + \xi_{n,m}^{if} \quad (54)$$

where $$\frac{\partial \theta_{n,m}^{if}}{\partial \delta \vec{r}_m}$$

is the Jacobian of the range-equivalent phase with respect to the orbital error sub-state for satellite m. The code minus carrier measurement from satellite m and receiver n is given by $$z_{n,m}^{ifcmc} = \rho_{n,m}^{if} - \theta_{n,m}^{if} \quad (55)$$

The measurement model is given by $$z_{n,m}^{ifcmc} = -\lambda_{if} N_{n,m}^{if} + \epsilon_{n,m}^{if} \quad (56)$$

The complete measurement vector is thus constructed as follows:

$$\vec{z}^{if} = [z_{1,1}^{ifcp} z_{1,1}^{ifcmc} \ldots z_{1,M}^{ifcp} z_{1,M}^{ifcmc} \ldots z_{N,M}^{ifcp} z_{N,M}^{ifcmc}]^T \quad (57)$$

and the measurement model matrix and measurement noise covariance matrix are constructed from (54) and (56) to be compatible with the measurement vector (57).

Referring again to FIG. 9, the collating filter 109 combines the estimated state vectors from the M ionosphere filters, the M code filters and the geometry filter to generate an output data set 110 containing separate estimates of the ionosphere model (30) parameters for each satellite, troposphere scale factors (33) for each receiver, and carrier phase ambiguities and multipath errors for each of N×M×2 L1 and L2 carrier phases. The L1 and L2 carrier phase ambiguities are recovered as follows. Given floated estimates $\hat{N}_{n,m}^{gf}$, $\hat{N}_{n,m}^{cf}$, and $\hat{N}_{n,m}^{if}$, the estimated L1 and L2 ambiguities can be obtained by applying the following least-squares solution derived from equations (6) and (14):

$$\begin{bmatrix} \hat{N}_{n,m}^{1} \\ \hat{N}_{n,m}^{2} \end{bmatrix} = (A^T P A)^{-1} A^T P \begin{bmatrix} \hat{N}_{n,m}^{gf} \\ \hat{N}_{n,m}^{wl} \\ \hat{N}_{n,m}^{if} \end{bmatrix} \quad (58)$$

where $$A = \begin{bmatrix} \frac{\lambda_1^3}{\lambda_2^2 - \lambda_1^2} & -\frac{\lambda_1^2 \lambda_2}{\lambda_2^2 - \lambda_1^2} \\ 1 & -1 \\ 1 & -\frac{\lambda_1}{\lambda_2} \end{bmatrix} \quad (59)$$

The VRS observables generation algorithm will now be described, according to one embodiment, with reference to FIG. 13. The algorithm operates on the observables data 100 and on the output 110 of the VRS estimation algorithm. The floated ambiguities plus estimation statistics generated by the Kalman filter are directed to the ambiguity resolution module 111, which implements one of several different ambiguity resolution algorithms that have been described in public domain publications. For example, one embodiment implements the LAMBDA algorithm described in P. Teunisson, *The Least-Squares Ambiguity Decorrelation Adjustment*, Journal of Geodesy 70, 1-2, 1995, and generates integer least-squares estimates of the ambiguities 112. The fixed integer ambiguities 112 along with the observables from the N reference receivers and the previously generated estimated parameters 110 are provided to process 113, which combines these inputs to compute the ionosphere and troposphere signal delay errors at each of the N reference receivers to the M satellites being used in the network solution.

Figure 13:
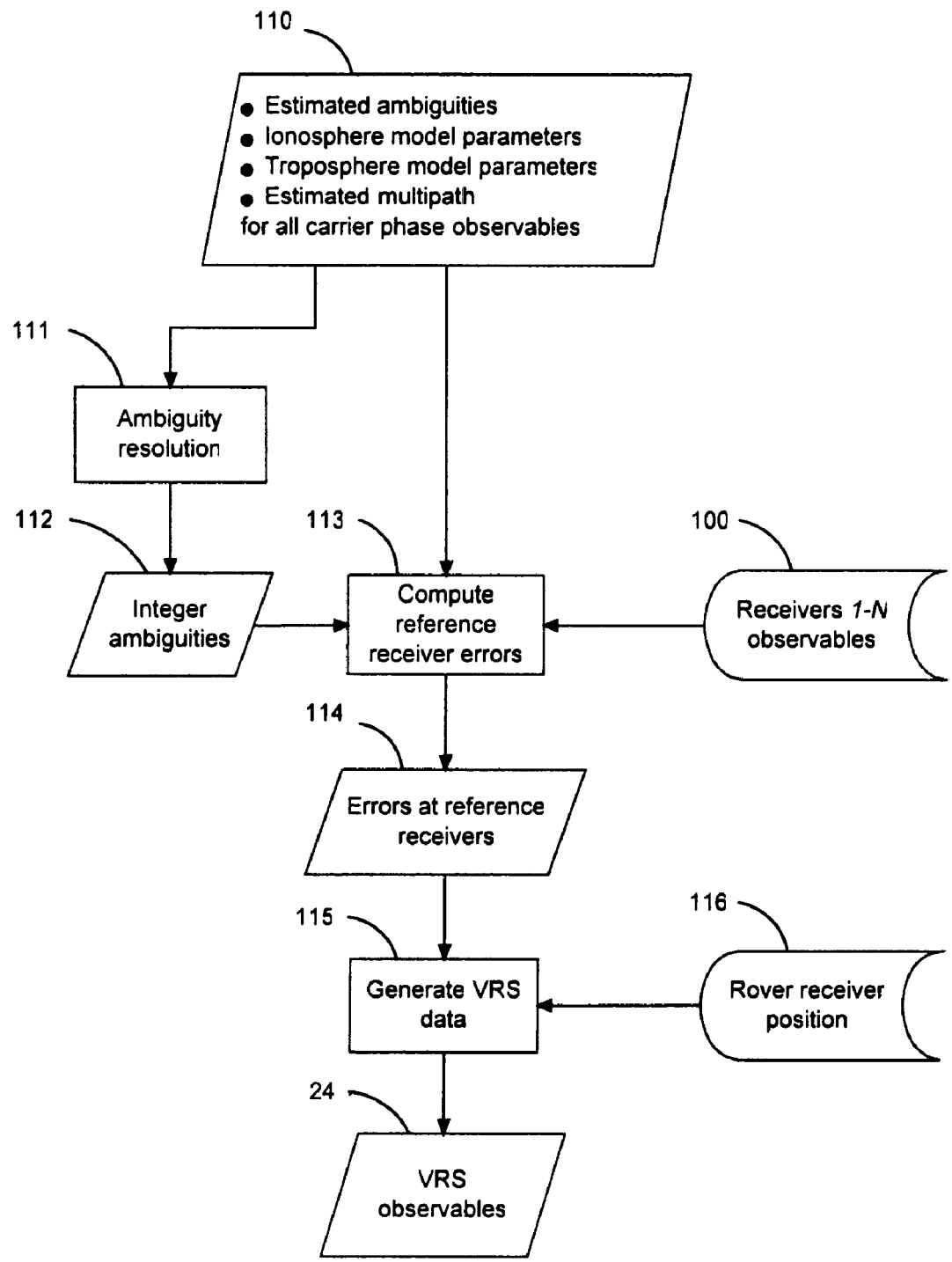
FIG. 13 shows the VRS observables generation data and processing flow diagram.

Process 115 in FIG. 13 generates the observables at the VRS position in two stages: The process first estimates the correlated atmospheric and environment errors at the rover position, and then generates pseudorange and carrier phase observables that are geometrically referenced at the VRS position and exhibit correlated atmospheric and environment errors occurring at the rover position. Either of the following two methods of estimation and VRS observables generation can be used.

In one embodiment of the invention, process 115 in FIG. 13 computes the correlated atmospheric and environment errors at the rover position using a precise VRS estimation process. This process runs the respective ionosphere filters and the geometry filter with reduced state vectors that exclude the floated ambiguity states, since these are now assumed to be known with no uncertainty. These are called the precise ionosphere filters and the precise geometry filter because they use precise carrier phase data to formulate their respective estimations.

The precise ionosphere filter state vector becomes $$\vec{x}_m^{gf} = [MP_{1,m}^{gf} \ldots MP_{N,m}^{gf} | I_{0,m} a_m b_m]^T \quad (60)$$

The precise ionosphere filters process the following geometry-free phase measurements:

$$\phi_{n,m}^{gf} + \overline{N}_{n,m}^{gf} = MP_{n,m}^{gf} I_{n,m} + \epsilon_{n,m}^{gf} \quad (61)$$

$$\overline{N}_{n,m}^{gf} = \frac{\lambda_1^2}{\lambda_2^2 - \lambda_1^2} (\overline{N}_{n,m}^1 \lambda_1 - \overline{N}_{n,m}^2 \lambda_2) \quad (62)$$

where $\overline{N}_{n,m}^1$ and $\overline{N}_{n,m}^2$ are the fixed L1 and L2 ambiguities 112. The transition matrix (40) process noise covariance (41) and measurement model matrix (43) are truncated to reflect the reduced state dynamics model. The resulting estimated state elements ($I_{0m}$, $a_m$, $b_m$) for m in 1, ..., M provide parameters for the ionosphere model (30) at a level of accuracy consistent with a fixed integer ambiguity position solution. The precise geometry filter state vector becomes $$\vec{x}^{if} = [S \delta T \delta t \delta \vec{r}_s]^T \quad (63)$$

The precise geometry filter processes the following ionosphere-free measurements:

$$z_{n,m}^{ifcp} = \theta_{n,m}^{if} - \hat{T}_{n,m} - \hat{r}_{n,m} - \lambda_{if} \overline{N}_{n,m}^{if} \quad (64)$$

$$= \begin{bmatrix} \hat{T}_{n,m} & 1 & -1 & \frac{\partial \theta_{n,m}^{if}}{\partial \delta \vec{r}_m} \end{bmatrix} \begin{bmatrix} S_n \\ \delta T_n \\ \delta t_m \\ \delta \vec{r}_m \end{bmatrix} + \xi_{n,m}^{if}$$

$$\overline{z}_{n,m}^{ifcmc} = \rho_{n,m}^{if} - \theta_{n,m}^{if} + \lambda_{if} \overline{N}_{n,m}^{if} \cong \epsilon_{n,m}^{if} \quad (65)$$

$$\overline{N}_{n,m}^{if} = \overline{N}_{n,m}^1 - \frac{\lambda_1}{\lambda_2} \overline{N}_{n,m}^2 \quad (66)$$

The transition matrix (51),(51), process noise covariance (52) and measurement model matrices derived from (64) and (65) are truncated to reflected the reduced state dynamics model. The resulting estimated state elements $S=[S_1 \ldots S_N]^T$ provide troposphere scale factors at the N reference receiver positions at a level of accuracy consistent with a fixed integer ambiguity position solution. These are used to construct the troposphere delay error at any position in the network using a linear spatial interpolation model (36).

The VRS observables ("VRS GNSS data") 24 (FIGS. 4 and 5) are then computed as follows. A master reference receiver R is identified from among the N reference receivers, typically the reference receiver that is closest to the VRS position. The observables comprise pseudoranges modeled by (1) and dual-frequency carrier phases modeled by (2) with n=R. The VRS observables used by the PP-HAPOS comprise the master reference receiver observables with troposphere and ionosphere delay errors at the rover receiver position. The VRS pseudoranges are computed as follows:

$$\rho_{V,m}^i = \rho_{R,m}^i + \Delta r_{VR,m} + (\hat{T}_{r,m} - \hat{T}_{R,m}) + (\hat{I}_{r,m}^i - \hat{I}_{R,m}^i) \quad (67)$$

where $\Delta \rho_{VR,m}$ is a geometric range displacement from the master reference receiver to the VRS position given by $\Delta r_{VR,m} = |\hat{r}_m - \hat{r}_V| - |\hat{r}_m - \hat{r}_R|$, $\hat{T}_{r,m} - \hat{T}_{R,m}$ is the difference in troposphere delays computed from the interpolation model (36) using the model parameters derived in (35) from the estimated troposphere scale factors in the precise geometry state (63), $\hat{I}_{r,m}^i - \hat{I}_{R,m}^i$ is the difference in ionosphere delays computed from the interpolation model (30) using the model parameters in the precise ionosphere filter states (60).

The VRS carrier phases are constructed as follows:

$$\phi_{V,m}^i = \phi_{R,m}^i - 1/\lambda_i (\Delta r_{VR,m} + (\hat{T}_{r,m} - \hat{T}_{R,m}) + (\hat{I}_{r,m}^i - \hat{I}_{R,m}^i)) \quad (68)$$

These VRS observables have the same receiver clock offset, satellite clock errors, multipath errors and observables noises as the master reference receiver. They have the approximately same troposphere and ionosphere delay errors as the roving receiver. Consequently, single differences between rover and VRS observables will result in the approximate cancellation of troposphere and ionosphere delay errors as well as exact cancellation of satellite clock errors.

In another embodiment of the invention, process 115 in FIG. 13 computes the correlated atmospheric and environment errors in the carrier phases at the rover position using interpolation of the carrier phase residuals. This method is predicated on the assumption that correlated atmospheric delay errors in the double-differenced carrier phase residuals conform to an approximate linear spatial model similar to (30). Each carrier phase residual is computed as:

$$\sigma \phi_{n,m}^i = \phi_{n,m}^i + \overline{N}_{n,m}^i + \frac{1}{\lambda_i} \hat{r}_{n,m} \quad (69)$$

$$= -\frac{1}{\lambda_i} (\delta \hat{r}_{n,m} + c(\delta T_n - \delta t_m) + T_{n,m} - I_{n,m}^i + MP_{n,m}^i) + \eta_{n,m}^i$$

where $\hat{r}_{n,m}$ is the estimated range between receiver n and satellite m using best available ephemeris data, $\overline{N}_{n,m}^i$ is the fixed integer ambiguity for i=1,2, n=1, ..., N and m=1, ..., M. The double-differenced carrier phase residuals are computed as:

$$\nabla \Delta \delta \phi_{n,m}^i = (\delta \phi_{n,m}^i - \delta \phi_{n,mb}^i) - (\delta \phi_{nb,m}^i - \delta \phi_{nb,mb}^i) \quad (70)$$

$$= -\frac{1}{\lambda_i} (\nabla \Delta T_{n,m} - \nabla \Delta I_{n,m}^i + \nabla \Delta MP_{n,m}^i) + \nabla \Delta \eta_{n,m}^i$$

where nb in 1, ..., N is a base receiver for computing between receiver single differences and mb in 1, ..., M is a base satellite for computing between satellite single differences. Double differencing effects the cancellation of common mode errors between satellites and between receivers, notably the receiver clock offsets, satellite clock offsets and orbital errors.

A spatial interpolation model similar to (30) for the double-differenced residuals for satellite m in 1, . . . , M is given by:

$$\nabla\Delta\delta\phi_{n,m}^{i} = \epsilon\nabla\Delta\phi_{0,m}^{i} + a_{m}^{i}\Delta\lambda_{n} + b_{m}^{i}\Delta L_{n} \quad (71)$$

where $\delta\nabla\Delta\phi_{0,m}^{i}$ is the double-differenced residual associated with the reference position for satellite m, $a_{m}^{i}$ is the latitude scale on the double-differenced residual for satellite m, $b_{m}^{i}$ is the latitude scale on the double-differenced residual for satellite m.

The parameters $\delta\nabla\Delta\hat{\phi}_{0,m}$, $\hat{a}_{m}^{i}$ and $\hat{b}_{m}^{i}$ are computed as estimates from a least-squares adjustment using the model (71) with measurements (70). The estimated residuals at the rover position are then given by $$\nabla\Delta\delta\hat{\phi}_{r,m}^{i} = \delta\nabla\Delta\hat{\phi}_{0,m}^{i} + \hat{a}_{m}^{i}\Delta\lambda_{r} + \hat{b}_{m}^{i}\Delta L_{r} \quad (72)$$

where $(\Delta\lambda_r, \Delta L_r)$ are the rover antenna relative position coordinates with respect to the reference position. The undifferenced residuals containing the correlated phase errors are then obtained by reversing the double difference operation (70) as follows.

$$\delta\hat{\phi}_{r,m}^{i} = \nabla\Delta\delta\hat{\phi}_{r,m}^{i} + (\delta\phi_{nb,m}^{i} - \delta\phi_{nb,mb}^{i}) + \delta\hat{\phi}_{r,mb}^{i} \quad (73)$$

where $\delta\phi_{nb,m}^{i}$ and $\delta\phi_{nb,mb}^{i}$ are given by (69). $\delta\hat{\phi}_{r,mb}^{i}$ is constructed as follows $$\delta\hat{\phi}_{r,mb}^{i} = -\frac{1}{\lambda_i}\left(\hat{T}_{r,mb} - \hat{I}_{r,mb}^{i}\right)$$

where $\hat{I}_{r,mb}^{i}$ and $\hat{T}_{r,mb}$ are computed by interpolation using (30) and (36).

The VRS observables ("VRS GNSS data") 24 are then computed as follows. A master reference receiver R is identified from among the N reference receivers, typically the reference receiver that is closest to the VRS position. The VRS pseudoranges are computed using (67) with $\hat{T}_{r,m} - \hat{T}_{R,m}$ computed from the interpolation model (36) using the model parameters derived in (35) from the estimated troposphere scale factors in the estimated geometry filter state (50), and $\hat{I}_{r,m} - \hat{I}_{R,m}$ from the interpolation model (30) using the model parameters in the ionosphere filter states (39). The VRS carrier phases are constructed as follows:

$$\phi_{V,m}^{i} = \phi_{R,m}^{i} - (1/\lambda_i)\Delta r_{VR,m} - \delta\phi_{R,m}^{i} + \delta\hat{\phi}_{r,m}^{i} \quad (74)$$

where $\delta\phi_{R,m}^{i}$ was computed in (69) and $\delta\hat{\phi}_{r,m}^{i}$ is the interpolated carrier phase residual given by (73). The VRS observables 24 have the same receiver clock offset, satellite clock errors, multipath errors and observables noises as the master reference receiver. They have the approximately same troposphere and ionosphere delay errors as the roving receiver. Consequently, single differences between rover and VRS observables will result in the approximate cancellation of troposphere and ionosphere delay errors as well as exact cancellation of satellite clock errors.

Figure 6:
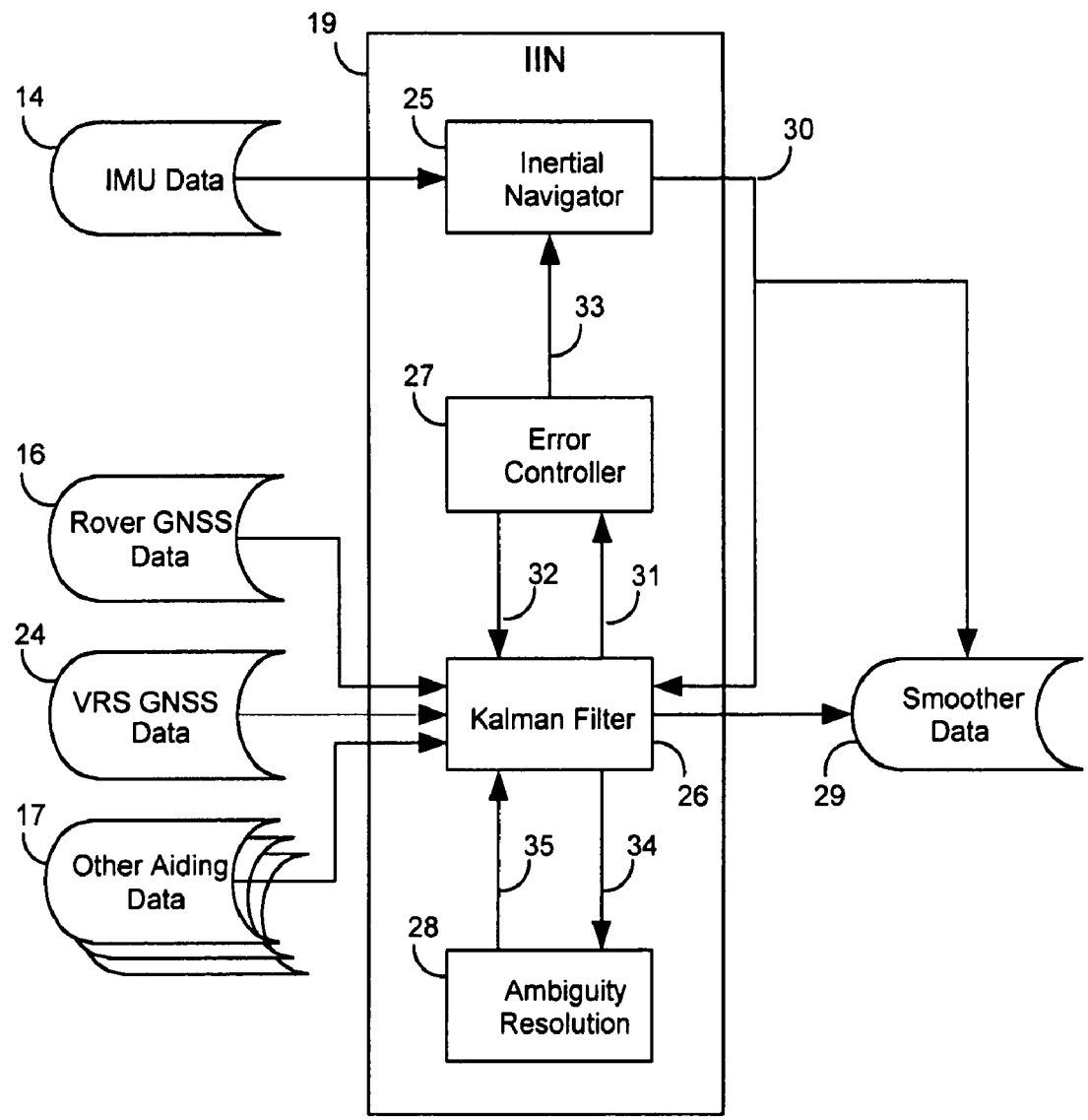
FIG. 6 shows the integrated inertial navigation (IIN) module of the post-processing subsystem.

Referring again to FIG. 4, the IIN module 19 will now be further described. The IIN module 19 is a GNSS-AINS subsystem and is further illustrated in FIG. 6. The IIN module 19 operates on the data recorded by the vehicle subsystem 9 and the VRS observables data 24 generated by the VRS module 18. It implements a version of the AINS function described above, designed specifically for computing precise centimeter-level position and sub-arc-minute orientation using inertially aided RTK, such as the algorithm described by B. Scherzinger, *Precise Robust Positioning with Inertially-Aided RTK*, Journal of the Institute of Navigation, Summer 2006 (hereinafter "Scherzinger [2006]").

The IIN module 19 includes an inertial navigator module 25, a Kalman filter 26, an error controller 27 and an ambiguity resolution module (ARM) 28. The details of the functionality and implementation of these components will be well-understood and by those of ordinary skill in the art in view of this description, and need not be described herein. The functionality of these elements is described here at a high level to provide context.

The inertial navigator module 25 solves Newton's well-known equations of motion on the earth in a conventional manner to compute the position, velocity and orientation of the vehicle IMU 10 from the recorded IMU data 15.

The Kalman filter 26 imports the inertial navigation solution 30 output by the inertial navigator module 25 and aiding sensor data 16,17 and 24, and estimates the inertial navigator errors and inertial sensor errors in a conventional manner using a conventional INS error model. The Kalman filter 26 outputs the estimated INS errors 31 to the INS error controller 27 and to a smoother data file 29.

The error controller 27 translates the estimated errors 31 into resets 33 to the inertial navigator's integration processes. It also returns a correction 32 to the Kalman filter to account for the correction 31 to the inertial navigator 25. The control loop formed by the inertial navigator module 25, Kalman filter 26 and error controller 27 is called the INS error regulation loop.

The Kalman filter 26 also estimates the floated carrier phase ambiguities in the combinations of rover and VRS carrier phase observables that are part of the rover GNSS data 16 and VRS GNSS data 24, respectively. These carrier phase observables typically include two or more frequencies to obtain fast and reliable floated ambiguity estimation and subsequent ambiguity resolution. The Kalman filter 26 outputs the estimated floated ambiguities and their covariances 34 to the ARM 28.

The ARM 28 employs any of various well-known conventional algorithms to determine the integer ambiguities from the floated ambiguity data 34 once these have converged to sufficient estimation accuracy. Once the ARM 28 has fixed and verified the integer ambiguities 35, it returns the verified integer ambiguities 35 to the Kalman filter 26, which then constructs precise and unambiguous carrier phase measurements that result in precise position error estimation and INS error regulation. The resulting INS navigation solution 30 contains very accurate position and accurate orientation data.

Referring again to FIG. 4, the smoother module 40 operates on the smoother data file 29 generated by the IIN module 19. The smoother module 40 implements a smoothing algorithm compatible with the Kalman filter 26 that essentially runs a least-squares adjustment backwards in time on the Kalman filter data recorded in the smoother data file 29, to generate a globally optimal estimate of INS errors, and then corrects the inertial navigation solution recorded in the smoother data file 29 to generate the BET 41. More specifically, the smoother 40 computes and writes a time history file of estimated INS errors with better accuracy (called the smoothed errors) than those from the Kalman filter 26, from the data generated by the Kalman filter 26 (specifically, the estimated state vector, covariance matrix and measurement residuals). The smoother 40 then reads the smoothed error file and corrects the recorded AINS navigation solution 30 to generate a navigation solution with best achievable accuracy, which is the BET 41.

Figure 7:
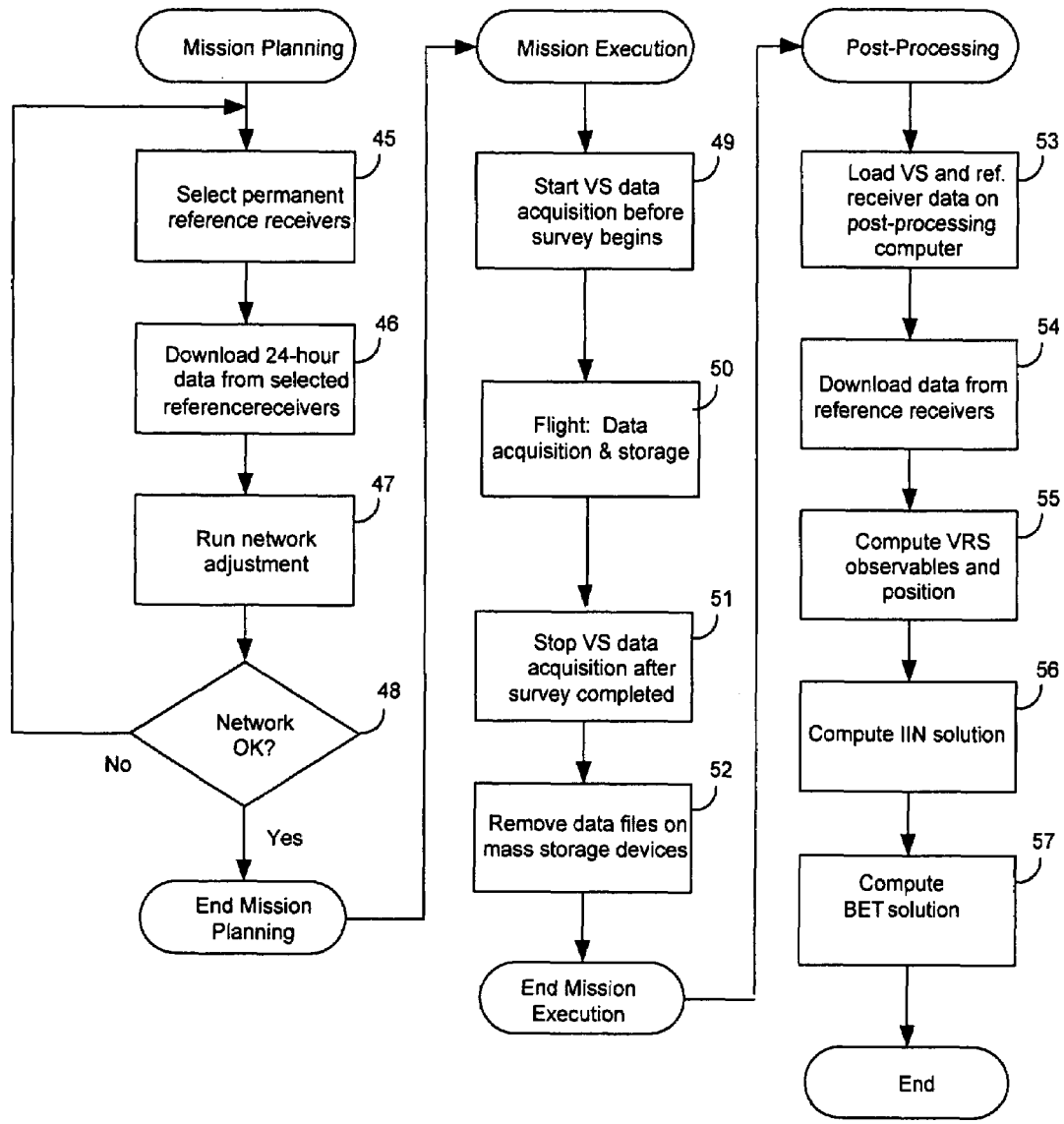
FIG. 7 is a flow diagram illustrating an example of the use and operation of the PM-HAPOS.

The manner in which the PM-HAPOS can be used will now be described with reference to FIG. 7, using the example of an aerial photogrammetry project. For purposes of description, the project area is assumed to have dimensions 200 km×200 km and to have typical CORS density. The photogrammetry project requires a precise and reliable position and orientation solution over the course of a 3-hour flight (the data acquisition period) to georeference each pixel of each of several thousands of digital images recorded during the flight.

The overall process has three phases: mission planning, mission execution and post-processing. The mission planning phase begins when a photogrammetry analyst (PA) reviews the project area, the CORS receivers in and around the project area, and the project GNSS satellite coverage during a planned flight. The PA selects a set of five or more CORS receivers and a time window during which their data are required (step 45). The PA then downloads observables files from each selected CORS receiver for the previous 24 hours (step 46). Typically, these data are downloaded via the Internet.

Next, the PA runs the 24-hour data through the network adjustment subsystem 7 (step 47) to compute the relative position of each CORS antenna with respect to one selected antenna. This network adjustment either verifies or corrects the published antenna positions or rejects the observables from one or more CORS receivers because of bad data quality. The required relative accuracy of each antenna position is typically 1-2 centimeters. The PA then decides whether or not to use the network based on the results of the network adjustment (step 48). The network is considered to be acceptable if a sufficient number of CORS receivers evenly surround the project area and generate reliable observables as determined by the network adjustment. A sufficient number is typically four or more reference receivers. If the network is not acceptable, the PA selects a new network (i.e., a new set of CORS receivers) and repeats the previous steps. Once the PA has configured an acceptable network, the mission planning is finished. The mission execution phase can then proceed.

In the mission execution phase, an aircraft equipment operator (AEO) responsible for operating the aircraft-mounted camera and supporting equipment typically starts the vehicle subsystem (VS) data acquisition just before the survey begins, e.g., a few minutes before the aircraft starts to taxi towards take-off (step 49). During flight, the vehicle subsystem 9 acquires data (i.e., IMU data 15, rover GNSS data 16 and other aiding sensor data 17) and stores it on one or more removable (disconnectable) mass storage devices 37 (e.g., disk drives) within the vehicle subsystem 9 (step 50). The AEO typically turns off the vehicle subsystem data acquisition after the aircraft has landed and taxied to a stationary position (step 51). The AEO then retrieves all of the recorded data, including the camera image files and recorded vehicle subsystem data (step 52), by removing the mass storage device(s) from the vehicle subsystem 9, to complete the mission execution phase.

In the post-processing phase, the PA loads the recorded vehicle subsystem data onto the post-processing subsystem 36 (step 53). This can be done by, for example, directly connecting the mass storage devices from the vehicle subsystem to the post-processing subsystem 36 and loading the data from those devices, or by loading the data from some other data storage facility to which the data may have been stored or transferred after the flight. Next, the PA downloads the CORS observables spanning the data acquisition period (the photogrammetry mission time) via the Internet, to the post-processing subsystem 36 (step 54).

The PA then activates the post-processing subsystem 36 to cause it to execute a sequence of operations to compute a precise position and orientation solution (the BET 41) for the recorded GNSS-AINS data, for the entire data acquisition period, based on the recorded GNSS-AINS data files. (The BET 41 will subsequently be associated with the corresponding images from the survey camera.) Note that the term "solution" in this context refers collectively to a large number of associated position and orientation data items, each associated with a different instant in time. Note that the following sequence of operations can be performed automatically in response to a single initiating user input by the PA, or each operation may be initiated individually by the PA.

First, the VRS module 18 in the post-processing subsystem 36 computes a VRS synthetic observables file (the VRS GNSS observables 24) based on the reference receiver observables (reference GNSS data 20) and history of real-time rover antenna positions (step 55). The IIN 19 then computes the position and orientation solution 30 based on the VRS synthetic observables file and the data recorded by the vehicle subsystem 9 (step 56). The smoother module 40 then computes the BET 41 (step 57), which is the end product of this process.

ALTERNATIVE EMBODIMENTS

While the embodiments described above use IARTK with GNSS, it is possible to implement a GNSS-AINS that uses VRS but does not implement IARTK. Such a system can run a separate RTK module to resolve ambiguities and can then correct the rover-reference differential phase observables to obtain the precise differential phase ranges that characterize RTK positioning. These precise phase ranges then would be used as aiding data in the Kalman filter.

Thus, a PM-HAPOS has been described.

Software to implement the technique introduced here may be stored on a machine-readable medium. A "machine-accessible medium", as the term is used herein, includes any mechanism that provides (i.e., stores and/or transmits) information in a form accessible by a machine (e.g., a computer, network device, personal digital assistant (PDA), manufacturing tool, any device with a set of one or more processors, etc.). For example, a machine-accessible medium includes recordable/non-recordable media (e.g., read-only memory (ROM); random access memory (RAM); magnetic disk storage media; optical storage media; flash memory devices; etc.), etc.

The term "logic", as used herein, can include, for example, hardwired circuitry, programmable circuitry, software, or any combination thereof.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising,
after a data acquisition period during which GNSS data and INS data have been acquired on a mobile platform:
generating position data representing positions of the mobile platform, based on the GNSS data and INS data acquired during the data acquisition period;

using a network RTK subsystem which includes a VRS subsystem to generate correction data associated with the data acquisition period; and correcting the position data based on the correction data.

2. A method as recited in claim 1, wherein using the network RTK subsystem comprises:

acquiring differential GNSS observables measurements; and performing integer carrier phase ambiguity resolution and carrier phase measurements.

3. A method as recited in claim 2, wherein using the network RTK subsystem further comprises:

integrating observables from a plurality of GNSS reference receivers arranged in a network to correct for atmospheric delays in GNSS observables acquired by the mobile platform, when a distance from the mobile platform to the nearest reference receiver exceeds a specified distance.

4. A post-mission position and orientation system comprising:

a GNSS-AINS subsystem to generate position data representing positions of a mobile platform, based on GNSS data and INS data acquired during a data acquisition period by the mobile platform; and a network RTK subsystem including a VRS subsystem to generate correction data associated with the data acquisition period, wherein the GNSS-AINS subsystem further is to generate the position data based on the correction data;

wherein neither the GNSS-AINS subsystem nor the network RTK subsystem is located on the mobile platform.

5. A system as recited in claim 4, further comprising:

a network adjustment subsystem to evaluate and correct antenna positions for a plurality of GNSS reference receivers arranged in a network, wherein the network RTK subsystem generates the correction data based on the corrected antenna positions.

6. A system as recited in claim 4, wherein the mobile platform.

7. A system as recited in claim 4, wherein the network RTK subsystem comprises a VRS subsystem.

8. A system as recited in claim 4, wherein the network RTK subsystem is configured to:

acquire differential GNSS observables measurements; and perform integer carrier phase ambiguity resolution and carrier phase measurements.

9. A system as recited in claim 4, wherein the network RTK subsystem is configured to:

integrate observables from a plurality of GNSS reference receivers arranged in a network to correct for atmospheric delays in GNSS observables acquired by the mobile platform, when a distance from the mobile platform to the nearest reference receiver exceeds a specified distance.

* * * * *